United States Patent
Deng

(10) Patent No.: US 12,530,862 B2
(45) Date of Patent: Jan. 20, 2026

(54) METHOD AND SYSTEM FOR EXTRACTING NAIL CONTOURS

(71) Applicant: SHANGHAI HUIZI COSMETICS CO., LTD., Shanghai (CN)

(72) Inventor: Jingbiao Deng, Shanghai (CN)

(73) Assignee: SHANGHAI HUIZI COSMETICS CO., LTD., Shanghai (CN)

( * ) Notice: Subject to any disclaimer, the term of this patent is extended or adjusted under 35 U.S.C. 154(b) by 175 days.

(21) Appl. No.: 18/551,010

(22) PCT Filed: Apr. 28, 2021

(86) PCT No.: PCT/CN2021/090435
§ 371 (c)(1),
(2) Date: Sep. 18, 2023

(87) PCT Pub. No.: WO2022/198745
PCT Pub. Date: Sep. 29, 2022

(65) Prior Publication Data
US 2024/0169689 A1    May 23, 2024

(30) Foreign Application Priority Data
Mar. 24, 2021   (CN) .......................... 202110312686.8

(51) Int. Cl.
*G06V 10/44*     (2022.01)
*G06V 10/26*     (2022.01)
(Continued)

(52) U.S. Cl.
CPC ............ *G06V 10/44* (2022.01); *G06V 10/267* (2022.01); *G06V 10/469* (2022.01); *G06V 20/64* (2022.01)

(58) Field of Classification Search
CPC ...... G06V 10/44; G06V 20/64; G06V 10/469; G06V 10/267
See application file for complete search history.

(56) References Cited

U.S. PATENT DOCUMENTS 7,123,983 B2 * 10/2006 Yogo ...................... A45D 31/00
                                                                    700/161
2014/0183769 A1     7/2014 Li et al.
(Continued)

FOREIGN PATENT DOCUMENTS

CN          106056614          10/2016
CN          108500475           9/2018
(Continued)

OTHER PUBLICATIONS

R. B. Rusu and S. Cousins, "3D is here: Point Cloud Library (PCL)," 2011 IEEE International Conference on Robotics and Automation, Shanghai, China, 2011, pp. 1-4, doi: 10.1109/ICRA.2011.5980567. (Year: 2011).*

(Continued)

*Primary Examiner* — Yu Chen
(74) *Attorney, Agent, or Firm* — HSML P.C.

(57) ABSTRACT

The present application provides a method and system for extracting nail contours. The method is based on the system and comprises: the step of data acquisition: carrying out 3D scanning to obtain finger 3D data of a target finger, wherein the finger 3D data include complete nail 3D data: the step of point cloud processing of data: converting the finger 3D data converted into 3D point cloud data to obtain a finger point cloud, wherein the finger point cloud includes a nail curved-surface point cloud; the step of nail point cloud acquisition: segmenting the finger point cloud to obtain the nail curved-surface point cloud; the step of nail point cloud flattening: flattening the nail curved-surface point cloud in an equal surface area manner to obtain a nail plane point cloud in a planar state; and the step of nail contour drawing: drawing a nail contour according to the contour of the nail plane point cloud. According to the method and system for extracting nail contours, the nail plane point cloud formed after the nail curved-surface point cloud of the curved nail is flattened is (Continued)

obtained, and the shape of an outer contour point cloud of the flattened nail plane point cloud better fits the outer contour of the curved nail.

13 Claims, 14 Drawing Sheets

(51) Int. Cl.
*G06V 10/46* (2022.01)
*G06V 20/64* (2022.01)

(56) References Cited

U.S. PATENT DOCUMENTS

| | | | | |
|---|---|---|---|---|
| 2014/0313136 A1* | 10/2014 | Kratz | ............... | G06F 3/0425 345/173 |
| 2015/0096426 A1* | 4/2015 | Culver | ............... | G10D 3/173 84/322 |
| 2017/0278304 A1* | 9/2017 | Hildreth | ............... | G06F 3/017 |
| 2019/0095747 A1* | 3/2019 | Sasaki | ............... | G06T 7/181 |
| 2021/0120935 A1* | 4/2021 | Shashou | ............... | B25J 9/026 |
| 2021/0169197 A1* | 6/2021 | Zhang | ............... | B33Y 80/00 |

FOREIGN PATENT DOCUMENTS

| | | | |
|---|---|---|---|
| CN | 109272519 | 1/2019 | |
| CN | 109770520 | 5/2019 | |
| CN | 110477575 | 11/2019 | |
| CN | 110477575 A | * 11/2019 | ............ A45D 29/00 |
| JP | 2006-519030 | 8/2006 | |
| JP | 2020-177578 | 10/2020 | |

OTHER PUBLICATIONS

A. Aldoma et al., "Tutorial: Point Cloud Library: Three-Dimensional Object Recognition and 6 DOF Pose Estimation," in IEEE Robotics & Automation Magazine, vol. 19, No. 3, pp. 80-91, Sep. 2012, doi: 10.1109/MRA.2012.2206675. (Year: 2012).*
International Search Report, issued in the corresponding PCT application No. PCT/CN2021/090435, dated Dec. 22, 2021, 3 pages.
Australian Office Action, issued in the corresponding Australian patent application No. 2021436510, dated Nov. 15, 2023, 2 pages.
First Japanese Office Action, issued in the corresponding Japanese patent application No. 2023-552543, dated Jul. 30, 2024, 9 pages with the machine translation.
Second Japanese Office Action, issued in the corresponding Japanese patent application No. 2023-552543, dated Dec. 10, 2024, 7 pages with the machine translation.

* cited by examiner

METHOD AND SYSTEM FOR EXTRACTING NAIL CONTOURS

BACKGROUND

Field

The present application relates to the field of image processing, and more particularly, relates to a method and system for extracting nail contours based on 3D point cloud results.

Description of the Related Art

In recent years, to meet people's pursuit for the beauty of nails, a simple nail-beatifying product, called nail sticker, has appeared on the market. The nail sticker is a formed sticker that can be directly stuck onto the nails with an adhesive layer. Compared with traditional nail polish for beatifying nails, the nail sticker has the advantages of being easy to operate, low in price, capable of being used anytime and anywhere, thus becoming popular to more and more people with high fashion and beauty requirements.

Generally, the shape of the nail sticker has been determined when the nail sticker is produced in factory, and for the sake of attractiveness, the outer contour of the nail sticker typically has a perfect edge radian in a planar state. However, the constant and perfect edge radian may not fit the actual contour of the nails of users and cannot completely adapt to the shape of nails of different users, so the nail sticker often fails to cover the whole nail or is out of the range of the nail when stuck on to the nail of users.

The method adopted to solve this problem at present is to extract the finger contours of users by means of image recognition. For example, Chinese invention application Publication No.CN109770520A discloses a printing method for a nail art device. According to the printing method for the nail art device, a camera device acquires a video or a picture of the finger of a user, and a control module determines the position of the finger according to the video or picture of the finger of user acquired by the camera device, and recognize a nail contour.

However, data extracted by the printing method for the nail art device are 2D data of a two-dimensional image and do not completely match a curved 3D nail shape, and consequentially, the extracted nail contour does not fit the actual contour of the nail.

To solve the above technical problems, a novel method for extracting nail contours is urgently needed to extract curved 3D nail contours that better fit nail edges of users.

ABSTRACT

In a first aspect, the present application provides a method for extracting nail contours. The method comprises:
 the step of data acquisition: carrying out 3D scanning on a target finger to obtain finger 3D data $Data_{Finger}$ of the target finger, wherein the finger 3D data $Data_{Finger}$ at least include nail 3D data $Data_{Nail}$ of a whole nail;
 the step of point cloud processing of data: converting the finger 3D data $Data_{Finger}$ into 3D point cloud data to obtain a finger point cloud $Cloud_{Finger}$, wherein the finger point cloud $Cloud_{Finger}$ at least includes a nail curved-surface point cloud $Cloud_{Nail-s}$ of the whole nail;
 the step of nail point cloud acquisition: segmenting the finger point cloud $Cloud_{Finger}$ to obtain the nail curved-surface point cloud $Cloud_{Nail-s}$ from the finger point cloud $Cloud_{Finger}$;
 the step of nail point cloud flattening: flattening the nail curved-surface point cloud $Cloud_{Nail-s}$ in an equal surface area manner to obtain a nail plane point cloud $Cloud_{Nail-p}$ in a planar state; and
 the step of nail contour drawing: drawing a shape of a contour point cloud $Cloud_{Contour}$ according to a contour of the nail plane point cloud $Cloud_{Nail-p}$ to obtain a nail model of the nail.

Further preferably, the step of point cloud processing of data comprises:
 The sub-step of point cloud direction correction: converting the finger point cloud $Cloud_{Finger}$ into an output finger point cloud $Cloud_{Finger-o}$ which is at a preset pose and position;
 Wherein the preset pose and position mean that a centroid of the output finger point cloud $Cloud_{Finger-o}$ overlaps with an origin of a coordinate system in a PCL, a front end of the finger points to a positive direction of an x-axis of the coordinate system and a back of the finger points to a negative direction of a z-axis of the coordinate system.

Further preferably, after the sub-step of point cloud direction correction, the step of point cloud processing of data further comprises:
 The sub-step of verification: verifying whether or not the back of the finger in the finger point cloud obtained by conversion points to the negative direction of the z-axis of the coordinate system;
 If so, rotating the finger point cloud obtained by conversion around the x-axis by 180°, and using the rotated finger point cloud as the output finger point cloud $Cloud_{Finger-o}$; or
 If not, directly using the finger point cloud obtained by conversion as the output finger point cloud $Cloud_{Finger-o}$.

Further preferably, the step of nail point cloud acquisition comprises:
 The sub-step of point cloud segmentation: segmenting the finger point cloud $Cloud_{Finger}$ by region growing segmentation to obtain the nail curved-surface point cloud $Cloud_{Nail-s}$ from the finger point cloud $Cloud_{Finger}$.

Further preferably, after the sub-step of point cloud segmentation, the step of nail point cloud acquisition further comprises:
 The sub-step of cluster constraining: inputting a search radius $Rrs'$ smaller than a search radius $R_{rs}$ based on the search radius $R_{rs}$, obtaining an angle $\theta_{Rrs'}$ between normal vectors of a point and a neighboring point under the search radius of $Rrs'$, and adding an angle threshold $\theta_{thres\ 2}$ as a judging criterion; and
 If a difference between the angles between the normal vectors of the point and the neighboring point under the search radius $R_{rs}$ and the search radius $Rrs'$ is greater than the angle threshold $\theta_{thres\ 2}$, stopping growing.

Further preferably, before the sub-step of point cloud segmentation, the step of nail point cloud acquisition further comprises:
 The sub-step of seed point $S_0$ selection: determining and obtaining a nail surface region (x, y) of the nail, selecting a point from the nail surface region (x, y) as a seed point $S_0$, and starting a growing process by means of the seed point $S_0$.

Further preferably, in the step of nail point cloud flattening, the nail curved-surface point cloud $Cloud_{Nail-s}$ is horizontally segmented along the x-axis into n layers of point clouds $L_i$, and then each layer of point cloud $L_i$ is spread and flattened as a whole in an equal length manner, so that the nail plane point cloud $\text{Cloud}_{Nail\text{-}p}$ of the nail in the planar state is obtained.

Further preferably, the step of nail point cloud flattening specifically comprises:

Unifying x-coordinates of all points $p_j$ in each layer of point cloud $L_i$, and keeping y-coordinates and z-coordinates of the points $p_j$ unchanged, so that an approximately arc point cloud set $\text{stand\_}L_i$ is obtained;

According to a y-coordinate $\text{Center}_y$ of a center line of the nail, dividing all points p in each layer of point cloud set $\text{stand\_}L_i$ into two parts: $\text{L\_part1}_i$ and $\text{L\_part2}_i$; and Ordering the arc point clouds $\text{L\_part1}_i$ and $\text{L\_part2}_i$ of each layer in a sequence away from the center line of the nail to obtain $\text{L\_ordered\_part}_i$.

Further preferably, the method further comprises the following step performed after the step of nail point cloud flattening:

The step of edge processing: carrying out edge processing on the nail plane point cloud $\text{Cloud}_{Nail\text{-}p}$ to make an edge of the nail plane point cloud $\text{Cloud}_{Nail\text{-}p}$ smooth.

In a second aspect, the present application further provides a system for extracting nail contours. The system is used to implement the method for extracting nail contours in any one technical solution mentioned above, and specifically comprises:

A data acquisition unit which is used for carrying out 3D scanning on a target finger to obtain finger 3D data $\text{Data}_{Finger}$ of the target finger, wherein the finger 3D data $\text{Data}_{Finger}$ at least include nail 3D data $\text{Data}_{Nail}$ of a whole nail;

A data conversion unit which is in communication connection with the data acquisition unit, receives the finger 3D data $\text{Data}_{Finger}$ and converts the finger 3D data $\text{Data}_{Finger}$ of into 3D point cloud data to obtain a finger point cloud $\text{Cloud}_{Finger}$, wherein the finger point cloud $\text{Cloud}_{Finger}$ at least includes a nail curved-surface point cloud $\text{Cloud}_{Nail\text{-}s}$ of the whole nail;

A PCL which is in communication connection with the data conversion unit;

A segmentation module which is located in the PCL and is configured to segment the finger point cloud $\text{Cloud}_{Finger}$ to extract a nail curved-surface point cloud of the nail from the finger point cloud $\text{Cloud}_{Finger}$;

A flattening module which is in communication connection with the PCL and is configured to spread and flatten the nail curved-surface point cloud $\text{Cloud}_{Nail\text{-}s}$ in an equal surface area manner to obtain a nail plane point cloud $\text{Cloud}_{Nail\text{-}p}$ in a planar state; and A drawing module which is in communication connection with the flattening module, receives the nail plane point cloud $\text{Cloud}_{Nail\text{-}p}$, and draws a shape of a contour point cloud $\text{Cloud}_{Contour}$ according to a contour of the nail plane point cloud $\text{Cloud}_{Nail\text{-}p}$ to obtain a nail model of the nail.

Further preferably, the data conversion unit comprises a correction module configured to convert the finger point cloud $\text{Cloud}_{Finger}$ into an output finger point cloud $\text{Cloud}_{Finger\text{-}o}$, which is at a preset pose and position.

Further preferably, the system for extracting nail contours further comprises:

A verification module which is in communication connection with the correction module and is configured to receive the finger point cloud obtained by conversion and verify a pointing direction of a back of a finger in the finger point cloud:

If the back of the finger in the finger point cloud obtained by conversion points to a positive direction of a z-axis of a coordinate system, the correction module rotates the finger point cloud around an x-axis by 180°, and then the rotated finger point cloud is used as the output finger point cloud $\text{Cloud}_{Finger\text{-}o}$;

If the back of the finger in the finger point cloud obtained after conversion points to a negative direction of the z-axis of the coordinate system, the finger point cloud obtained by conversion is directly used as the output finger point cloud $\text{Cloud}_{Finger\text{-}o}$.

Further preferably, the system for extracting nail contours further comprises a seed point $S_0$ selection module which is in communication connection with the segmentation module and is configured to obtain a nail surface region $\text{Nrange}(x,y)$ of the nail curved-surface point cloud $\text{Cloud}_{Nail\text{-}s}$ and select a point from the nail surface region $\text{Nrange}(x,y)$ as a seed point $S_0$, wherein the segmentation module starts a growing process by means of the seed point $S_0$ Further preferably, the flattening module is configured to segment the nail curved-surface point cloud $\text{Cloud}_{Nail\text{-}s}$ along the x-axis into n layers of point clouds $L_i$, and then each layer of point cloud $L_i$ is spread and flattened as a whole in an equal length manner to obtain a nail plane point cloud $\text{Cloud}_{Nail\text{-}p}$ in a planar state.

Further preferably, the flattening module is configured to unify x-coordinates of all points $p_j$ in each layer of point cloud $L_i$, keep y-coordinates and z-coordinates of the points $p_j$ unchanged to obtain an approximately arc point cloud set $\text{stand\_}L_i$, divide all points p in each layer of point cloud set $\text{stand\_}L_i$ into two parts: $\text{L\_part1}_i$ and $\text{L\_part2}_i$, according to a y-coordinate $\text{Center}_y$ of a center line of the nail, and finally orders the arc point clouds $\text{L\_part1}_i$ and $\text{L\_part2}_i$ of each layer in a sequence away from the center line of the nail to obtain $\text{L\_ordered\_part}_i$.

Further preferably, the PCL further comprises:

An edge processing module used for carrying out edge processing on the nail plane point cloud $\text{Cloud}_{Nail\text{-}p}$ to make an edge of the nail plane point cloud $\text{Cloud}_{Nail\text{-}p}$ smooth.

Compared with the prior art, the invention has the following beneficial effects:

1. The curved nail point cloud is acquired by 3D point clouds and is then flattened, and the shape of the flattened outer contour point cloud better fits the outer contour of the curved nail.
2. The finger point cloud obtained by conversion is located at a desired pose and position, so that calculation and processing of the finger point cloud are greatly facilitated.
3. The cluster constraining condition is added to accurately determine by calculation whether a point in the finger point cloud belongs to the nail point cloud, so that the nail curved-surface point cloud can be separated from the finger point cloud more effectively.
4. The nail surface region is determined at first, then one point is selected from the nail surface region as a seed point to start the growing process, so that it is ensured that the nail curved-surface point cloud is obtained in the growing process; the growing process only needs to be carried out once, so that the time of a growing algorithm is shortened, and the efficiency of the algorithm is improved.
5. Layering is carried out in the nail growing direction, then each layer is flattened, the obtained nail plane point cloud is flattened in the width direction, and the shape contour drawn according to the contour point clout of the nail plane point cloud can better fit the nail in the lateral dimension of the nail.

6. Edge processing is carried out on the nail plane point cloud to make the edge of the nail plane point cloud smooth, so that the obtained nail model is more attractive.

BRIEF DESCRIPTION OF THE THE DRAWINGS

REFERENCE SIGNS 1, data acquisition unit; 2, data conversion unit; 3, PCL; 4, segmentation module; 5, flattening module; 6, drawing module; 7, correction module; 8, verification module; 9, selection module; 10, boundary extraction module; 11, edge processing module.

DETAILED DESCRIPTION OF THE INVENTION

The technical solutions of the implementations of the present application will be described below in conjunction with the accompanying drawings.

It should be understood that the specific examples in this specification are merely used to help those skilled in the art gain a better understanding of the implementations of the present application, and are not intended to limit the scope of the implementations of the present application.

It should also be understood that the serial numbers of the processes in different implementations of the present application do not represent the sequential order in which the processes are performed, and the performing order of the processes should be determined by the functions and internal logic of these processes and should not limit the implementation process of the implementations of the present application.

It should be further understood that the implementations described in the specification can be implemented separately or in combination, and the present application has no limitation in this aspect.

Unless otherwise specified, all technical and scientific terms in the implementations of the present application have meanings commonly understood by those skilled in the art. The terms in the present application are merely for the purpose of describing specific implementations, and are not intended to limit the scope of the present application. The term "and/or" in the present application refers to any one and all possible combinations of one or more related items listed.

Implementation 1

Implementation 1 of the present application provides a method for extracting nail contours, and particularly relates to a method for extracting nail contours based on 3D point cloud results.

Figure 1:
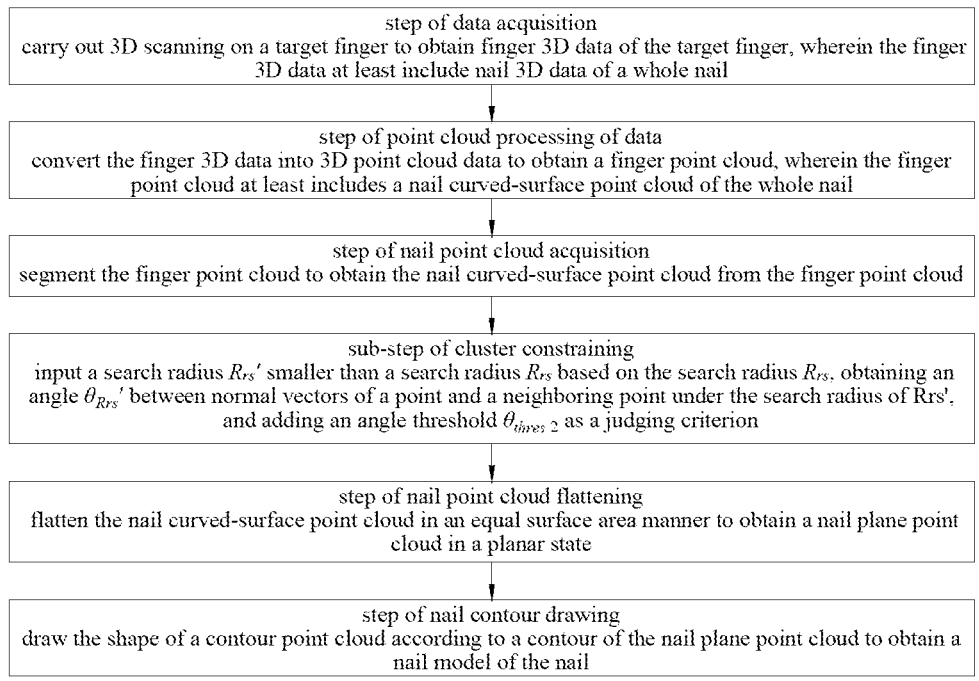
FIG. 1 is a flow diagram of a method for extracting nail contours according to Implementation 1.

Specifically, as shown in FIG. 1, the method for extracting nail contours according to Implementation 1 comprises:

The step of data acquisition: 3D scanning is carried out on a target finger to obtain finger 3D data $Data_{Finger}$ of the target finger, wherein the finger 3D data $Data_{Finger}$ at least includes nail 3D data $Data_{Nail}$ of a whole nail;

The step of point cloud processing of data: the finger 3D data $Data_{Finger}$ are converted into 3D point cloud data to obtain a finger point cloud $Cloud_{Finger}$, wherein finger point cloud $Cloud_{Finger}$ at least includes a nail curved-surface point cloud $Cloud_{Nail-s}$ of the whole nail;

The step of nail point cloud acquisition: the finger point cloud $Cloud_{Finger}$ is segmented to obtain the nail curved-surface point cloud $Cloud_{Nail-s}$ from the finger point cloud $Cloud_{Finger}$;

The step of nail point cloud flattening: the nail curved-surface point cloud $Cloud_{Nail-s}$ is flattened in an equal surface area manner to obtain a nail plane point cloud $Cloud_{Nail-p}$ in a planar state; and The step of nail contour drawing: the shape of a contour point cloud $Cloud_{Contour}$ is drawn according to the contour the nail plane point cloud $Cloud_{Nail-p}$ to obtain a nail model of the nail.

Compared with the prior art, the method for extracting nail contours according to Implementation 1 acquires the nail plane point cloud $Cloud_{Nail-p}$ formed after the nail curved-surface point cloud $Cloud_{Nail-s}$ of the curved nail with an uneven surface, and the shape of the outer contour point cloud $Cloud_{Contour}$ of the nail plane point cloud $Cloud_{Nail-p}$ better fits the outer contour of the curved nail.

In this way, the shape of the outer contour point cloud $Cloud_{Contour}$ is drawn according to the contour of the nail plane point cloud $Cloud_{Nail-p}$ to obtain the nail model in the planar state. A nail sticker made with the nail model as a template can match the surface radian of the nail, and when the nail sticker is stuck onto the nail surface of users, the outer contour of the nail sticker fits the outer contour of the nail, so that the situation where the nail sticker fails to cover the whole nail or is out of the range of the nail is avoided.

In other words, according to the method for extracting nail contours according to Implementation 1, a three-dimensional image of the surface of the nail is obtained and is then subjected to point cloud processing, the nail curved-surface point cloud $Cloud_{Nail-s}$ obtained after point cloud processing is segmented and flattened to obtain the nail plane point cloud $Cloud_{Nail-p}$, and the shape of the outer contour point cloud $Cloud_{Contour}$ is drawn according to the outer contour of the nail plane point cloud $Cloud_{Nail-p}$ to obtain the nail model in the planar state. Compared with a nail model obtained based on a two-dimensional image in the prior art, the shape of the outer contour of the nail extracted in Implementation 1 is completely identical with the outer contour of the nail of the user, the nail model is drawn according to the shape of the outer contour of the nail, the nail sticker made based on the nail model can be perfectly stuck onto the nail of the user, and the situation where the nail sticker fails to cover the whole nail or is out of the range of the nail is avoided.

Figure 2:
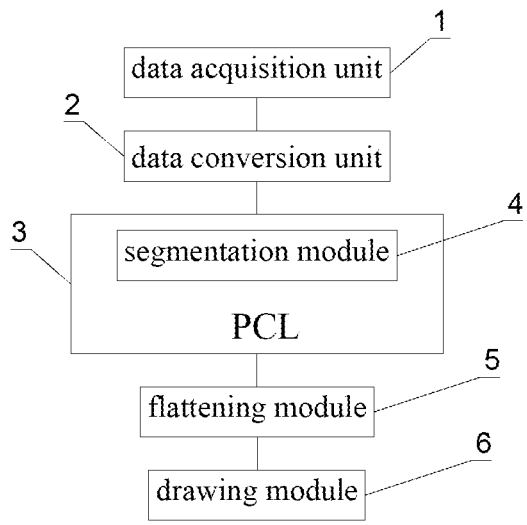
FIG. 2 is a block diagram of a system for extracting nail counters according to Implementation 1.

As shown in FIG. 2, Implementation 1 further provides a system for extracting nail contours. The system for extracting nail contours can extract nail contours using the method for extracting nail contours. Specifically, the system for extracting nail contours comprises a data acquisition unit 1, a data conversion unit 2, a PCL 3, a flattening module 5 and a drawing module 6 which are in communication connection with each other in sequence, wherein the PCL 3 comprises a segmentation module 4.

Specifically, as shown in FIG. 1 and FIG. 2, in the step of data acquisition, the data acquisition unit 1 carries out 3D scanning on the target finger to acquire the finger 3D data $Data_{Finger}$ of the target finger. To extract the finger contour of the target finger, the data acquisition unit 1 carried out 3D scanning at least on the whole nail on the target finger and skin around the nail in the step of data acquisition. So, the finger 3D data $Data_{Finger}$ at least include the nail 3D data $Data_{Nail}$ of the whole nail, and generally, the finger 3D data $Data_{Finger}$ at least also include skin 3D data $Data_{Skin}$ of the skin around the nail.

The data acquisition unit 1 may be a laser radar, a depth camera, a 3D scanner made of the laser radar or the depth camera, a structured light camera, a binocular camera, or the like. So, in the step of data acquisition, the data acquisition unit 1 carries out 3D scanning on the target finger by means of the laser radar based on the triangular ranging principle or the TOF principle, or carries out 3D scanning on the target finger by means of the depth camera based on the structured light ranging principle, the binocular vision ranging principle and the TOF principle, so as to obtain the finger 3D data $Data_{Finger}$ rapidly and accurately.

All these ranging principles for 3D scanning such as the triangular ranging principle, the TOF ranging principle, the structured light ranging principle and the binocular vision ranging principle belong to the prior art, have been widely used in daily life, and thus will not be detailed anymore herein.

Particularly, the triangular ranging principle, the TOF ranging principle, the structured light ranging principle and the binocular vision ranging principle all have respective advantages and disadvantages in actual use, have different requirements for measurement environments, optical fibers and distances, have different measurement accuracies and product costs, and thus should be selected according to the type of the data acquisition unit 1 in actual application of this implementation.

Specifically, as shown in FIG. 1 and FIG. 2, in the step of point cloud processing of data, the data conversion unit 2 receives the finger 3D data $Data_{Finger}$ collected and sent by the data acquisition unit 1 and then converts the format of the finger 3D data $Data_{Finger}$ into a 3D point cloud data format, namely a pcd format, to obtain the finger point cloud $Cloud_{Finger}$. Specifically, the data conversion unit 2 converts the format of the finger 3D data $Data_{Finger}$ into a data format supported by the PCL 3, such as the pcd format or a ply format. The specific format selected should be determined according to the format of data acquired by the data acquisition unit 1 and the data format supported by the segmentation module 4. Because the finger 3D data $Data_{Finger}$ at least include the nail 3D data $Data_{Nail}$ of the nail and the skin 3D data $Data_{Skin}$ of the skin around the nail, the finger point cloud $Cloud_{Finger}$ obtained after the format of the finger 3D data $Data_{Finger}$ is converted into a data format supported by the PCL, such as the pcd format, at least includes the nail curved-surface point cloud $Cloud_{Nail-s}$ of the curved nail with the uneven surface and a skin point cloud $Cloud_{Skin}$ of the skin around the nail.

Of course, in other embodiments of Implementation 1, if the data acquisition unit 1 has a data conversion function, the data acquisition unit 1 can also be used as the data conversion unit 2 to directly convert the data format of the acquired finger 3D data $Data_{Finger}$ into the pcd format to obtain the finger point cloud $Cloud_{Finger}$, in the step of point cloud processing of data.

The PCL (Point Cloud Library) 3 is a large cross-platform open-source C++ programming library established based on point cloud-related researches of former researchers. For example, if the format of the finger 3D data $Data_{Finger}$ is converted into the pcd format supported by the PCL 3, the finger point cloud $Cloud_{Finger}$ obtained after the format of the finger 3D data $Data_{Finger}$ is converted into the pcd format is input to the PCL 3 to be processed by a related algorithm in the PCL 3.

Because the initially obtained finger 3D data $Data_{Finger}$ include the nail 3D data $Data_{Nail}$ of the whole nail and the skin 3D data $Data_{Skin}$ of the skin around the nail, the finger point cloud $Cloud_{Finger}$ obtained after point cloud processing and format conversion of the finger 3D data $Data_{Finger}$ includes the nail curved-surface point cloud $Cloud_{Nail-s}$ of the nail and the skin point cloud $Cloud_{skin}$ of the skin around the nail. When the contour of the nail is to be extracted, the nail curved-surface point cloud $Cloud_{Nail-s}$ and the skin point cloud $Cloud_{Skin}$ should be separated to extract the required finger curved-surface point cloud $Cloud_{Nail-s}$.

Figure 3:
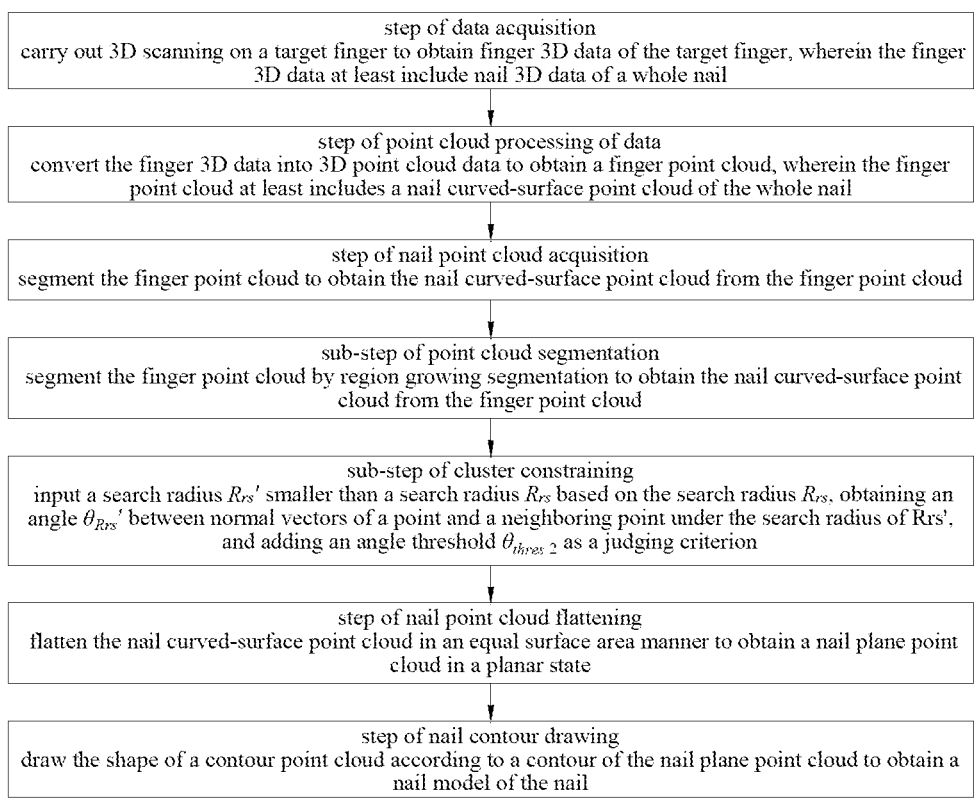
FIG. 3 is a flow diagram of the method for extracting nail contours according to Implementation 1 (the sub-step of point cloud segmentation)

In view of this, as shown in FIG. 3, the step of nail point cloud acquisition specifically comprises the sub-step of point cloud segmentation. In the sub-step of point cloud segmentation, the finger point cloud $Cloud_{Finger}$ is segmented by the segmentation module 4 in the PCL 3 to separate the nail curved-surface point cloud $Cloud_{Nail-s}$ and the skin point cloud $Cloud_{Skin}$ in the finger point cloud $Cloud_{Finger}$ sO that the nail curved-surface point cloud $Cloud_{Nail-s}$ of the curved nail is extracted.

Particularly, as shown in FIG. 2 and FIG. 3, region growing segmentation is used to segment and correct the finger point cloud $Cloud_{Finger}$ in the sub-step of point cloud segmentation as follows:

Input:
  Input a point cloud {P}
  Input a search radius $R_{rs}$
  Input a curvature threshold $cur_{thres}$ and an angle threshold $\theta_{thres}$ Output:
  Output a region cluster list R after point cloud segmentation Initialization:
  Initialize the region cluster list R
  Initialize a point list $\{A\} \leftarrow \{1, \ldots, P\_size\}$, and push all points of the point cloud to the list {A}
  Calculate normal vectors {N} of the points in the point cloud input
  Calculate the curvature {c} of the points in the point cloud input Algorithm cycle;
  As long as the list {A} is not empty,
  Clear the current region list $\{R_c\}$ and the current seed list $\{S_c\}$
  Find out a point $P_{min}$ with the minimum curvature at present, and remove the point $P_{min}$ with the minimum curvature from the list $\{A\}\{A\} \leftarrow \{A\}\backslash P_{min}$
  Push the point $P_{min}$ with the minimum curvature, removed from the list {A}, into the current region list $\{R_c\}$ and the current seed list $\{S_c\}$ $\{S_c\} \leftarrow \{S_c\} \cup P_{min}, \{R_c\} \leftarrow \{R_c\} \cup P_{min}.$ For each point $\{S_c(i)\}$ in the current seed list $\{S_c\}$,
  Rapidly search out all neighboring points $\{Nb_c\}$ of the point $\{S_c(i)\}$ rapidly by k-d tree
  For each point $\{Nb_c(j)\}$ of all the neighboring points $\{Nb_c\}$,
  Traverse the list $\{Nb_c\}$ to find out whether or not there is a point $\{Nb_c(j)\}$ meeting the condition that the angle between the normal vectors of the point $\{S_c(i)\}$ and the current neighboring point $\{Nb_c(j)\}$ is smaller than the angle threshold $\theta_{thres}$, that is, $\cos^{-1}(S_c(i),$ and $Nb_c(j) \geq \theta_{thres})$, if yes,
    Add the point $\{Nb_c(j)\}$ meeting the condition to the current region list $\{R_c\}$, $\{R_c\} \leftarrow \{R_c\} \cup Nb_c(j)$ Delete the point $\{Nb_c(j)\}$ meeting the condition from the list {A}, $\{A\} \leftarrow \{A\} \cup Nb_c(j).$ If the curvature of the point $\{Nb_c(j)\}$ meeting the condition is smaller than the curvature threshold cur thres, push the point $\{Nb_c(j)\}$ meeting the condition into the current seed list $\{S_c\}$, $\{S_c\} \leftarrow \{S_c\} \cup Nb_c(j).$ Add the current region list $\{R_c\}$ into the region cluster list R output after segmentation, $\{R\} \leftarrow \{R\} \cup R_c.$ In this way, the finger point cloud $Cloud_{Finger}$ is segmented, the skin point cloud $Cloud_{Skin}$ is removed, and the nail curved-surface point cloud $Cloud_{Nail-s}$ of the nail is generated and extracted.

Specifically, as shown in FIG. 1 and FIG. 2, in the step of nail point cloud flattening, the nail curved-surface point cloud $Cloud_{Nail-s}$, acquired by the data conversion unit 2 in the step of nail point cloud acquisition, is flattened in the equal surface area manner by the flattening module 5 in communication connection with the segmentation module 4, so that the nail plane point cloud $Cloud_{Nail-p}$ in the planar state is obtained.

Finally, in the step of nail contour drawing, the drawing module 6 in communication connection with the flattening module 5 receives the nail plane point cloud $Cloud_{Nail-p}$ and then draws the shape of the contour point cloud $Cloud_{Nail-p}$ according to the contour of the nail plane point cloud $Cloud_{Nail-p}$ to obtain the nail model of the nail.

Nail stickers can be made and the nail shape can be studied later based on a nail sticker model made according the edge contour of the nail drawn according to the shape of the edge contour point cloud $Cloud_{Contour}$ obtained by the method and system.

It should be noted that nails in the present application may be fingernails or toenails.

Implementation 2

Implementation 2 of the present application provides a method and system for extracting nail contours. The method and system for extracting nail contours are based on the design and implementation of the method and system for extracting nail contours in Implementation 1, and have an actual process and structure similar to, but not completely identical with the actual process and structure of the method and system in Implementation 1, and the differences therebetween will be emphatically described below. Other details, except the differences, in this implementation should be regarded as being identical with those in Implementation 1, and will no longer be described.

Figure 4:
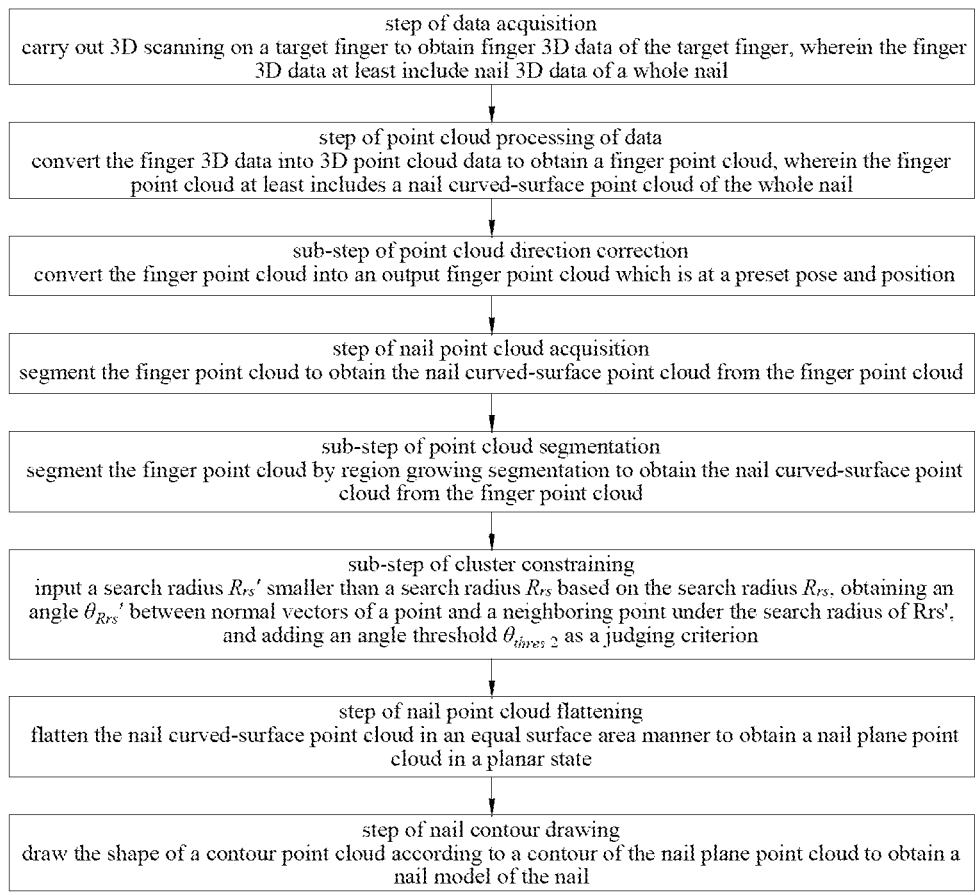
FIG. 4 is a flow diagram of a method for extracting nail contours according to Implementation 2 (the sub-step of point cloud direction correction)
Figure 5:
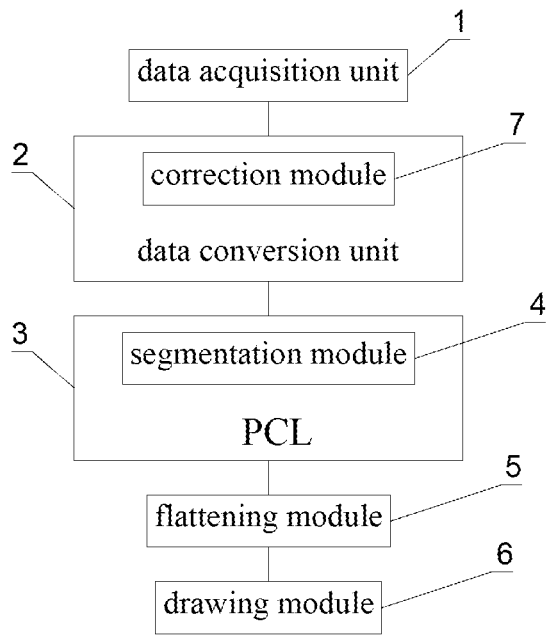
FIG. 5 is a block diagram of a system for extracting nail contours according to Implementation 2 (the correction module)

The PCL 3 can draw a coordinate system (x, y, z) by means of a visual window to locate the position of a point cloud in the three-dimensional space. In Implementation 2, to facilitate subsequent processing of the finger point cloud $Cloud_{Finger}$ to obtain a processing result accurately and efficiently, as shown in FIG. 4 and FIG. 5, the step of point cloud processing of data comprises the sub-step of point cloud direction correction, and the system for extracting nail contours further comprises a correction module 7. In the sub-step of point cloud direction correction, the pose and position of the finger point cloud $Cloud_{Finger}$, obtained through conversion by the data conversion unit 2, are changed by the correction module 7 to obtain an output finger point cloud $Cloud_{Finger-o}$ at a desired preset pose and a desired preset position.

The correction module 7 is configured independently and is in communication connection with the data conversion unit 2; or, the correction module 7 is integrated in the data conversion unit 2 or is one part of the data conversion unit 2.

Specifically, at the desired pose and position, the finger point cloud $Cloud_{Finger}$ is changed to enable the centroid of the output finger point cloud $Cloud_{Finger-o}$ to overlap with the origin of the coordinate system in the PCL 3, the front end of the finger to point to the positive direction of the x-axis of the coordinate system, and the back of the finger to point to the negative direction of the z-axis of the coordinate system.

More specifically, the front end of the finger refers to an end closer to the nail growing end of the finger and points to the growing direction of the nail, and the back of the finger refers to the side, on which the nail grows, of the finger, and points from the finger pulp to the nail of the finger.

Based on this requirement, the finger 3D data $Data_{Finger}$ obtained in the step of point cloud processing of data are converted to obtain the finger point cloud $Cloud_{Finger}$ (hereinafter also referred to as the input finger point cloud); then, in the step of point cloud direction correction, the correction module 7 changes the pose and position of the input finger point cloud $Cloud_{Finger}$ to obtain the new finger point cloud $Cloud_{Finger-o}$ (hereinafter collectively referred to as the output finger point cloud) at the desired pose and position.

In this embodiment, in the sub-step of point cloud direction correction, the correction module 7 changes the pose and position of the input finger point cloud $Cloud_{Finger}$ by means of a rotation matrix tf to convert the input finger point cloud $Cloud_{Finger}$ into the output finger point cloud $Cloud_{Finger-o}$, and the specific formula is as follows:

$$Cloud_{Finger-o} = Cloud_{Finger} * tf$$

$$tf = \begin{bmatrix} R & T \\ 0 & 1 \end{bmatrix}$$

$$R = \begin{bmatrix} \vec{v}_1 & \vec{v}_2 & \vec{v}_3 \end{bmatrix}^{-1}$$

$$T = \begin{bmatrix} -x_c \\ -y_c \\ -z_c \end{bmatrix}$$

Wherein, tf is the rotation matrix;

$Cloud_{Finger}$ is the input finger point cloud obtained after the finger 3D data $Data_{Finger}$ obtained in the step of point cloud processing of data are converted;

$Cloud_{Finger-o}$ is the output finger point cloud obtained after the input finger point cloud $Cloud_{Finger}$ is rotated by means of tf;

R is the pose rotation amount of the rotation matrix;

T is the movement amount of the rotation matrix;

$\vec{v}_1$, $\vec{v}_2$ and $\vec{v}_3$ are feature vectors in the x-axis direction, the y-axis direction and the z-axis direction obtained by solving a PCA (Principal Components Analysis) covariance matrix of the input finger point cloud $Cloud_{Finger}$;

c is the centroid of the input finger point cloud $Cloud_{Finger}$;

$x_c$, $y_c$ and $z_c$ are coordinates of the centroid of the input finger point cloud $Cloud_{Finger}$.

In this way, the output finger point cloud $Cloud_{Finger-o}$ obtained after tf rotation and conversion meets the condition that the centriod of the output finger point cloud $Cloud_{Finger-o}$ overlaps with the origin, the front end of the finger points to the positive direction of the x-axis and the back of the finger points to the negative direction of the z-axis. The output finger point cloud $Cloud_{Finger-o}$ at the preset pose and position provides a good precondition for subsequent processing of the output finger point cloud $Cloud_{Finger-o}$.

Figure 6:
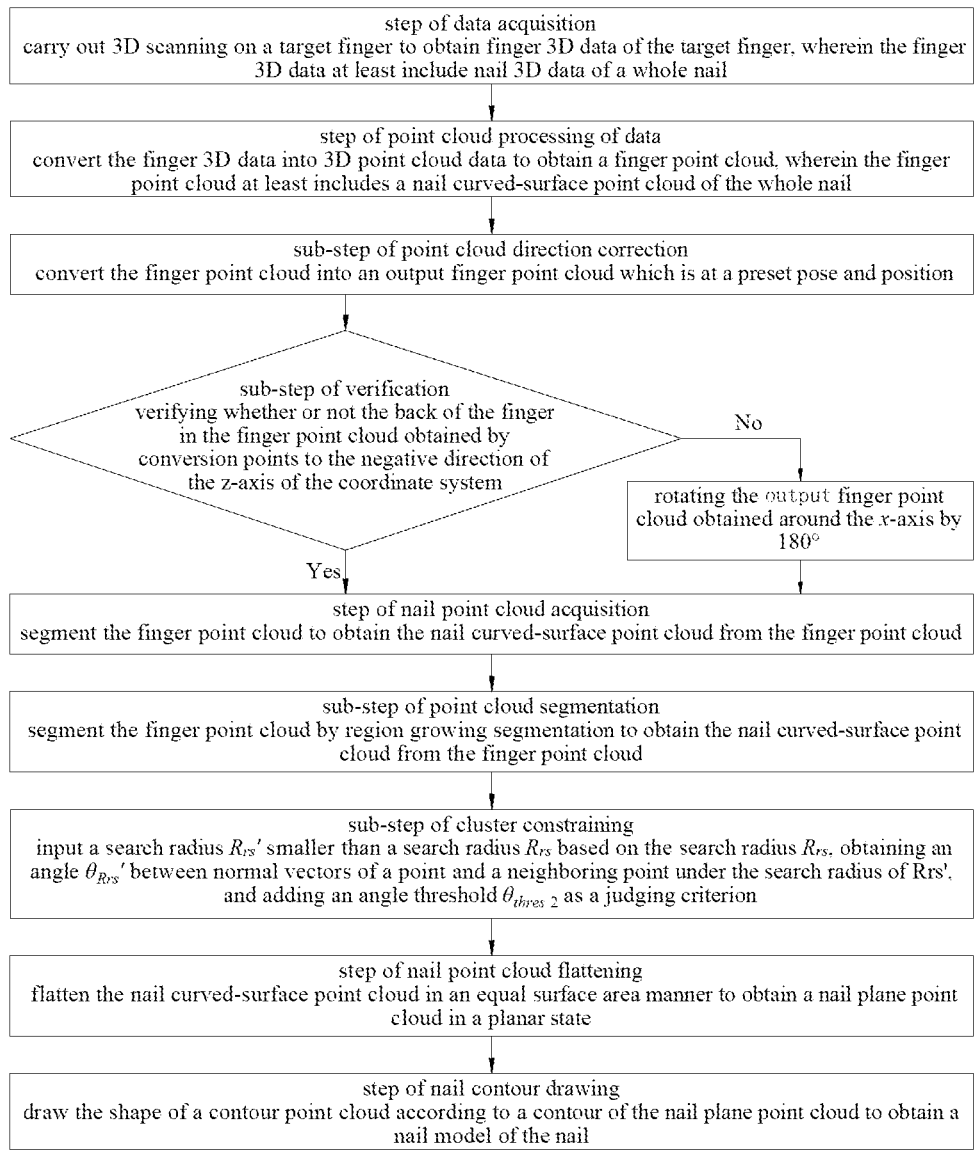
FIG. 6 is a flow diagram of the method for extracting nail contours according to Implementation 2 (the sub-step of verification)
Figure 7:
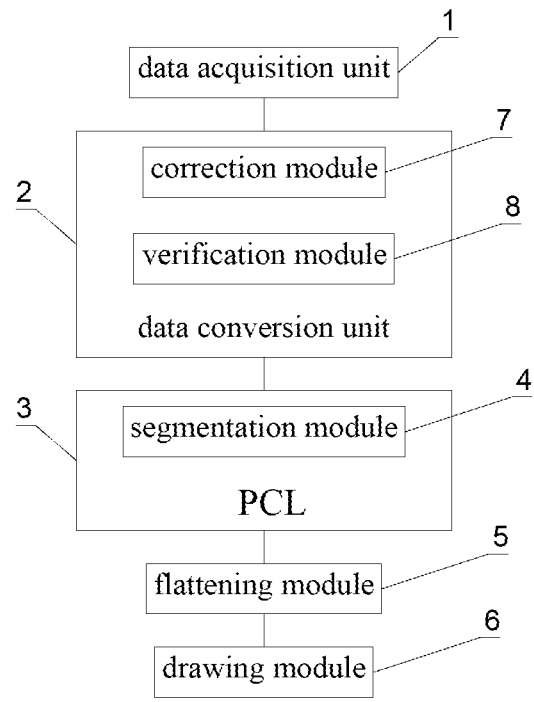
FIG. 7 is a block diagram of the system for extracting nail contours according to Implementation 2 (the verification module)

As for the output finger point cloud $Cloud_{Finger-o}$ obtained after tf rotation and conversion, there may exist the case where the back of the finger points to the positive direction of the z-axis of the coordinate system. So, as shown in FIG. 6 and FIG. 7, the step of point cloud processing of data further comprises the sub-step of verification performed after the sub-step of point cloud direction correction, and the system for extracting nail contours further comprises a verification module 8. In the sub-step of verification, the verification module 8 verifies whether or not the back of the finger in the finger point cloud points to the negative direction of the z-axis of the coordinate system.

The verification module 8 is in communication connection with the correction module 7. The verification module 8 is arranged independently and is in communication connection with the data conversion unit 2; or, the verification module 8 is integrated in the data conversion unit 2 or is one part of the data conversion unit 2.

If the verification module 8 verifies that the back of the finger in the finger point cloud obtained after conversion points to the positive direction of the z-axis of the coordinate system, the finger point cloud obtained after conversion is rotated around the x-axis by 180° by the correction module 7 to obtain the output finger point cloud $Cloud_{Finger-o}$ which is then output.

If the verification module 8 verifies that the back of the finger in the finger point cloud obtained after conversion points to the negative direction of the z-axis of the coordinate system, the finger point cloud obtained after conversion is directly used as the output finger point cloud $Cloud_{Finger-o}$ to be output.

In this way, it is ensured that the back of the finger in the output finger point cloud $Cloud_{Finger-o}$ points to the negative direction of the z-axis of the coordinate system.

Bounding box, also referred to as minimum bounding rectangle, is an algorithm for solving an optimum bonding space of a discrete point set, and the basic idea of this algorithm is that a large-sized geometry (called bounding box) with simple features is used to approximately replace a complicated geometric object. The PCL 3 acquires a point cloud bounding box, and data are calculated and processed by means of the bounding box.

Specifically, the sub-step of verification comprises the following steps:

The mean $\bar{z}$ of z-coordinates of the finger point cloud $Cloud_{Finger}$ obtained after tf rotation and conversion and the median $z_m$ of the bounding box are calculated and judged.

$$\bar{z} = \frac{\sum_n z_1 + z_2 + \ldots + z_n}{n}$$

$$z_m = \frac{z_{max} + z_{min}}{n}$$

If $\bar{z} - z_m < 0$, the finger point cloud obtained after tf rotation and conversion is rotated around the x-axis by 180°;

If $\bar{z} - z_m \geq 0$, the finger point cloud obtained after tf rotation and conversion remains unchanged.

Wherein, $\bar{z}$ is the mean of the z-axis coordinates of the finger point cloud;

$Z_m$ is the median of the finger point cloud bounding box on the z-axis;

$Z_{max}$ is the maximum value of the z-axis coordinates of the finger point cloud;

$Z_{min}$ is the minimum value of the z-axis coordinates of the finger point cloud.

More specifically, if $\bar{z} - z_m < 0$, it indicates that the back of the finger in the finger point cloud obtained after tf rotation and conversion points to the positive direction of the z-axis of the coordinate system. In this case, the finger point cloud obtained after tf rotation and conversion is rotated around the x-axis by 180°, and then the finger point cloud obtained after 180° rotation is used as the input finger point cloud $Cloud_{Finger-o}$.

If $\bar{z}-z_m \geq 0$, it indicates that the back of the finger in the finger point cloud $Cloud_{Finger}$ obtained after tf rotation and conversion points to the negative direction of the z-axis of the coordinate system. In this case, the finger point cloud obtained after tf rotation and conversion is kept unchanged and is directly used as the output finger point cloud $Cloud_{Finger-o}$.

Implementation 3

Implementation 3 of the present application provides a method and system for extracting nail contours. The method and system for extracting nail contours are based on the design and implementation of the method and system for extracting nail contours in Implementation 1 or 2, and have an actual process and structure similar to, but not completely identical with the actual process and structure of the method and system in Implementation 1 or 2, and the differences therebetween will be emphatically described below. Other details, except the differences, in this implementation should be regarded as being identical with those in Embodiment 1 or 2, and will no longer be described.

Figure 8:
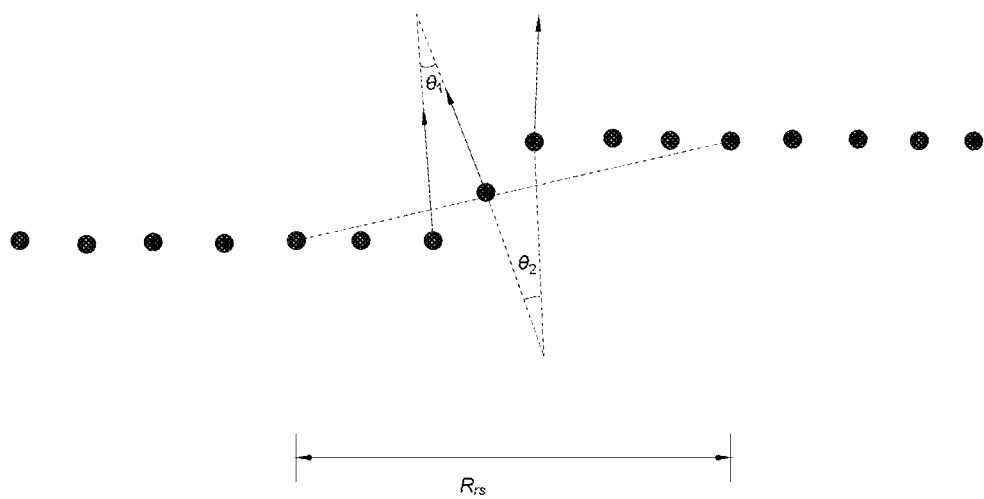
FIG. 8 is a normal diagram of adjacent point clouds under a search radius $R_{rs}$.

As shown in FIG. 8, when the nail curved-surface point cloud $Cloud_{Nail-s}$ and the skin point cloud $Cloud_{Skin}$ are separated by the segmentation module 4 in the sub-step of point cloud segmentation in Implementation 1, the segmentation and growing of the nail curved-surface point cloud $Cloud_{Nail-s}$ only depend on the angle $\Delta\theta$ between normal vectors of two adjacent points and the curvature threshold $cur_{thres}$ of the points under the cluster constraint condition, which results in large errors.

Especially, if the nail groove of the nail is invisible or the noise of a point cloud model of the finger point cloud $Cloud_{Finger}$ is loud, point clouds in the finger point cloud $Cloud_{Finger}$ will not undulate drastically, that is, a transitional region between the finger point cloud $Cloud_{Nail-s}$ and the skin point cloud $Cloud_{Skin}$ undulates slightly, great errors of the normal between adjacent cloud points in the skin point cloud $Cloud_{Skin}$ will be caused, if this is the case, points in the skin point cloud $Cloud_{Skin}$ may be mistakenly pushed into the current seed list $\{S_c\}$ and will be finally added into the region cluster list R output after segmentation, which means that the points in the skin point cloud $Cloud_{Skin}$ are mistakenly added into the nail curved-surface point cloud $Cloud_{Nail-s}$.

Figure 9A:
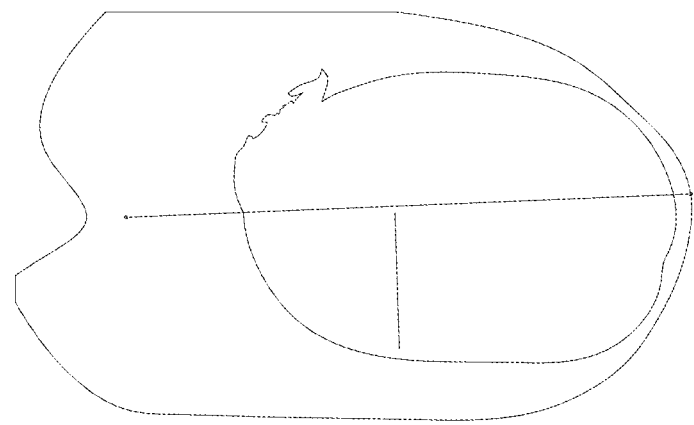
FIG. 9a illustrates a segmentation result of a finger point cloud based on the search radius $R_{rs}$.

Specifically, as shown in FIG. 9a, in case where the angles $\theta_1$ and $\theta_2$ between the normal vectors of neighboring points in the skin point cloud $Cloud_{Skin}$ are both smaller than the angle threshold $\theta_{thres}$ under a search radius $R_{rs}$, If the curvature of the point $\{Nb_c(j)\}$ meeting the condition is smaller than the curvature threshold $cur_{thres}$, push the point $\{Nb_c(j)\}$ meeting the condition into the current seed list $\{S_c\}$, $$\{S_c\} \leftarrow \{S_c\} \cup \{Nb_c(j)\}$$

Then, the following step will be performed:
Add the current region list $\{R_c\}$ into the region cluster list R output after segmentation, $$\{R\} \leftarrow \{R\} \cup \{R_c\}.$$

In this way, the points in the skin point cloud $Cloud_{Skin}$ are classified into the region cluster list R, which extends the growing region of the nail curved-surface point cloud $Cloud_{Nail-s}$ in the PCL outside the undulation (to the skin), as shown in FIG. 9a, and finally, nail segmentation fails.

In this case, in some embodiments of this implementation, the search radius $R_{rs}$ can be decreased to carry out more accurate calculation to obtain the normal vector of the point n more accurately.

Figure 9B:
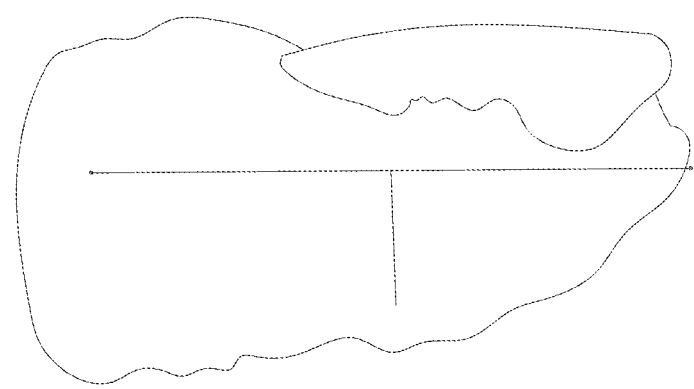
FIG. 9b is a segmentation result of the finger point cloud in case where the search radius Rrs is decreased.

However, as shown in FIG. 9b, although the normal vector of the point n can be calculated accurately by decreasing the search radius Ris, the noise of the model of the finger point cloud $Cloud_{Finger}$ will become louder with the decrease of the search radius $R_{rs}$, an algorithmic error during regional growing in the PCL 3 will be increased under the influence of the louder noise, and the nail groove cannot grow in place, so that the accuracy of a result will be affected.

Figure 10:
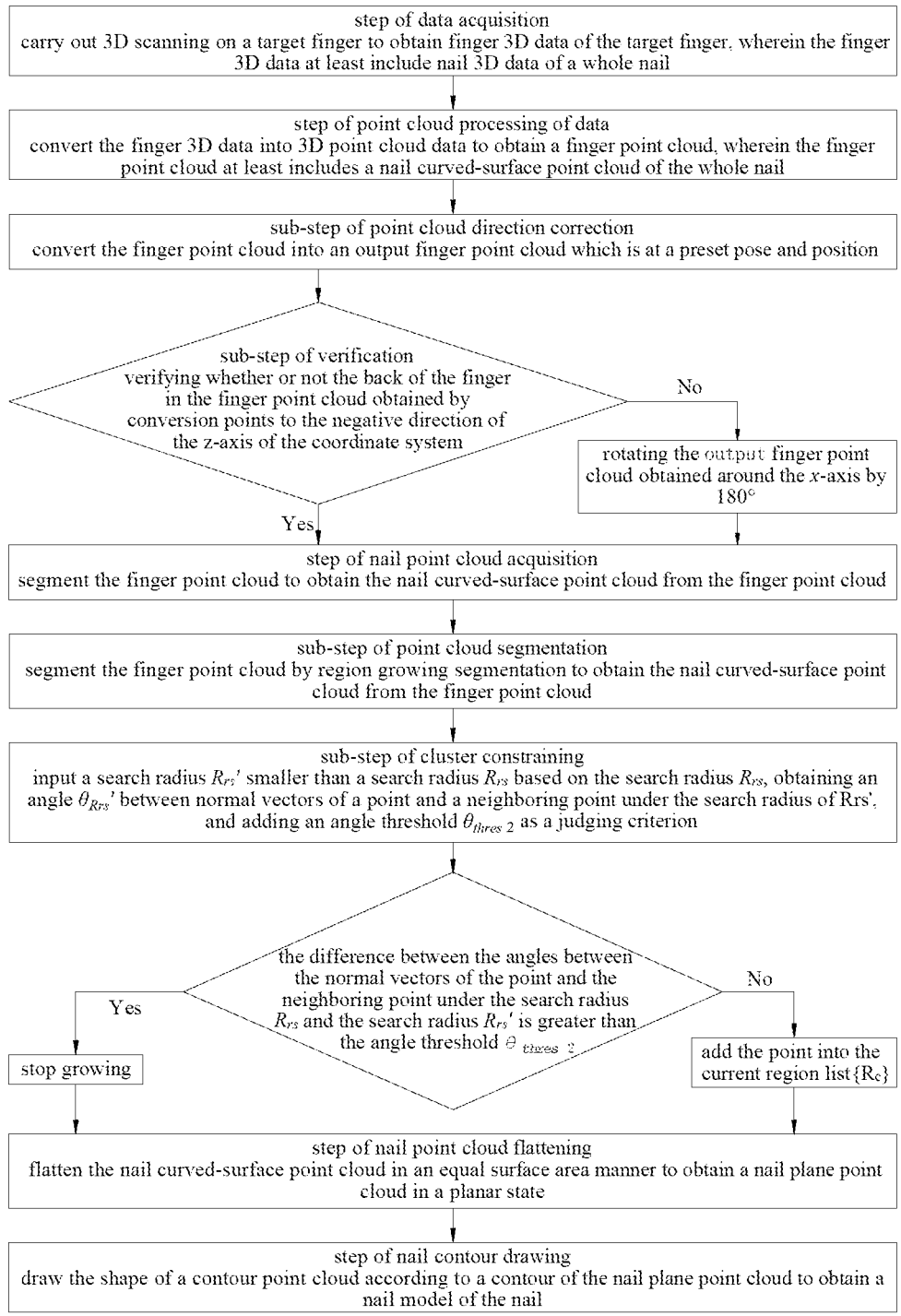
FIG. 10 is a flow diagram of a method for extracting nail contours according to Implementation 3.
Figure 11:
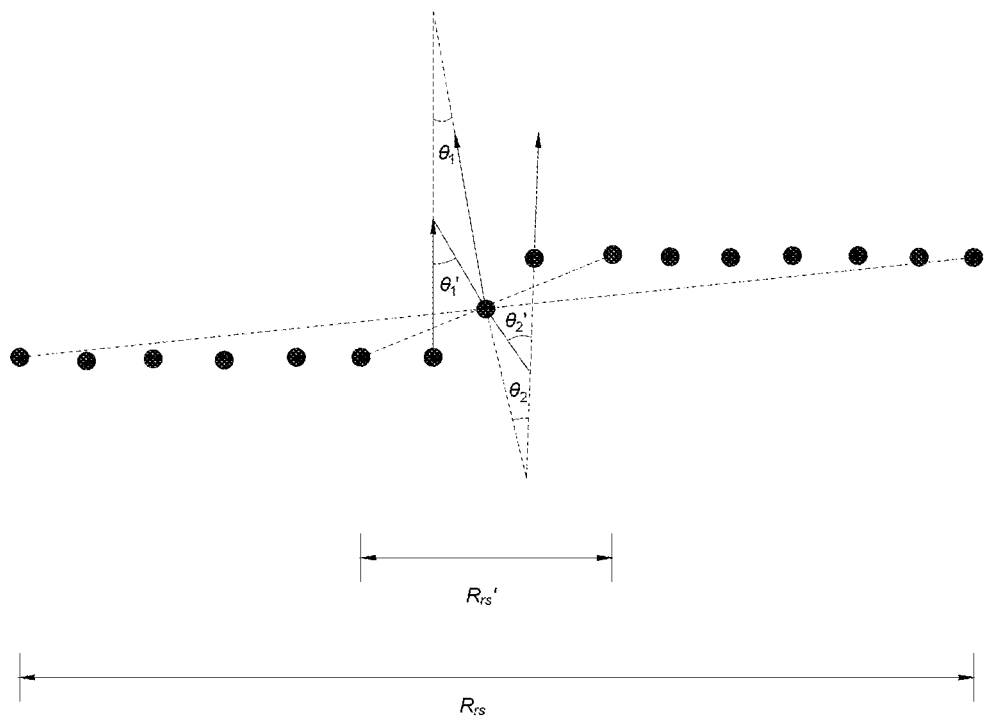
FIG. 11 is a normal diagram of adjacent point clouds under a search radius $R_{rs}'$ according to Implementation 3.

In view of this, as shown in FIG. 10 and FIG. 11, Implementation 3 makes an improvement by setting a sub-step of cluster constraining performed after the sub-step of point cloud segmentation, and in the sub-step of cluster constraining, a cluster constraint condition is added into the segmentation module 4 to improve the accuracy of results.

The sub-step of cluster constraining specifically comprises the following steps:
A search radius Rrs' is input based on the search radius $R_{rs}$, wherein the search radius Rrs' is smaller than the search radius $R_{rs}$; the angle $\theta_{Rrs'}$ between the normal vectors of a point and a neighboring point under the search radius Rrs' is obtained, and an angle threshold $\theta_{thres\ 2}$ is added to be used as a judging criterion;

If the current point meets $\theta_{Rrs}-\theta_{Rrs'}>\theta_{thres\ 2}$, growing is stopped;

If the current point meets $\theta_{Rrs}-\theta_{Rrs'} \leq \theta_{thres\ 2}$, the current point is added into the current region list $\{R_c\}$.

Wherein,
$\theta_{Rrs}$ is the angle between the normal vectors of the point and the neighboring point under the search radius $R_{rs}$;
$\theta_{Rrs'}$ is the angle between the normal vectors of the point and the neighboring point under the search radius Rrs'.

For example, as for two points $n_1$ and $n_2$, as shown in FIG. 11, point $n_1$ meets $\Delta\theta_1=\theta_1'-\theta_1$, and $\Delta\theta_1>\theta_{thres\ 2}$, so $n_1$ is not added into the current region $\{R_c\}$ list; point $n_1$ meets $\Delta\theta_2=\theta_2'-\theta_2$, and $\Delta\theta_2 \leq \theta_{thres\ 2}$, so $n_2$ is added into the current region list $\{R_c\}$.

Figure 12:
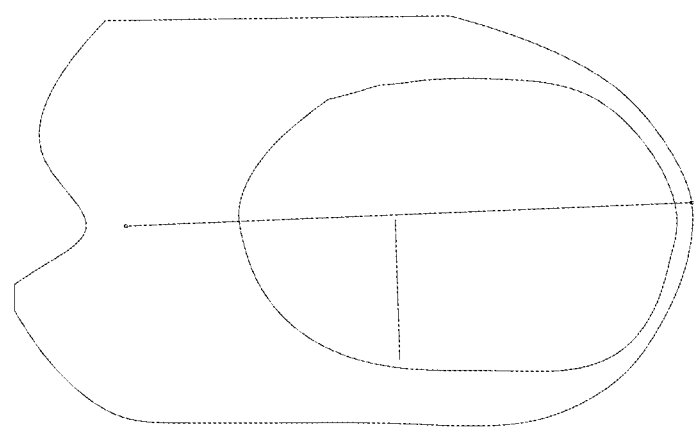
FIG. 12 is a segmentation result of the finger point cloud based on the search radius $R_{rs}'$ according to Implementation 3.

Wherein,
$\theta_1$ is the angle between the normal vectors of point $n_1$ and a neighboring point under the search radius $R_{rs}$;
$\theta_1'$ is the angle between the normal vectors of point $n_1$ and a neighboring point under the search radius $R_{rs}'$;
$\theta_2$ is the angle between the normal vectors of point $n_2$ and a neighboring point under the search radius $R_{rs}$;
$\theta_2'$ is an angle between the normal vectors of point $n_2$ and a neighboring point under the search radius $R_{rs}'$;

In this way, by adding the cluster constraint condition, as for a point meeting the condition that the angle between the normal vectors of the point and the current neighboring point is smaller than the angle threshold $\theta_{thres}$, the search radius $R_{rs}$ is decreased, and then further cluster constraining is carried out, and only when the angle between the normal vectors of the point and the neighboring point both under the search radius $R_{rs}$ and the search radius Rrs' is smaller than the angle threshold $\theta_{thres\ 2}$, it will be judged that this point belongs to the nail curved-surface point cloud $Cloud_{Nail-s}$ and will be added into the current region list $\{R_c\}$, and points not meeting the condition are removed, so that mistaken growing of the nail curved-surface point cloud $Cloud_{Nail-s}$ is effectively reduced, and the segmentation effect for accurately extracting and segmenting the curved-surface point cloud $Cloud_{Nail-s}$ from the finger point cloud $Cloud_{Finger}$ is realized, as shown in FIG. 12.

Herein, the search radius Rrs' is much smaller than the search radius $R_{rs}$. Specifically, the search radius Rrs' may be 1%-80% of the search radius $R_{rs}$, and more preferably, the search radius Rrs' may be 10%-30% of the search radius $R_{rs}$. In this way, the workload in the PCL 3 can be reasonably increased, the cloud points in the finger point cloud $Cloud_{Finger}$ can be segmented for growth under the condition that the segmentation accuracy requirement is met, and thus, the more accurate nail curved-surface point cloud $Cloud_{Nail-s}$ can be obtained by segmentation.

More particularly, when the segmentation module 4 performs the sub-step of point cloud segmentation and the sub-step of cluster constraining to carry out region growing of the nail curved-surface point cloud $Cloud_{Nail-s}$, the point with the minimum curvature will be repeatedly extracted from the list {A} to be used as a seed point So to start the growing process until no point is left in the list {A}. In this way, all regions of the input finger point cloud $Cloud_{Finger}$ can completely grow, and the nail curved-surface point cloud $Cloud_{Nail-s}$ is obtained from the input finger point cloud $Cloud_{Finger}$.

However, although the nail curved-surface point cloud $Cloud_{Nail-s}$ can be obtained by the segmentation module 4 in the above step, the point with the minimum curvature in the list {A} has to be repeatedly extracted to be used as the seed point So to start the growing process, and the unnecessary skin point cloud $Cloud_{Skin}$ in the finger point cloud $Cloud_{Finger}$ is also obtained in this process, so the growing process is repeated and redundant, and the growing efficiency of the nail curved-surface point cloud $Cloud_{Nail-s}$ is extremely low.

Figure 13:
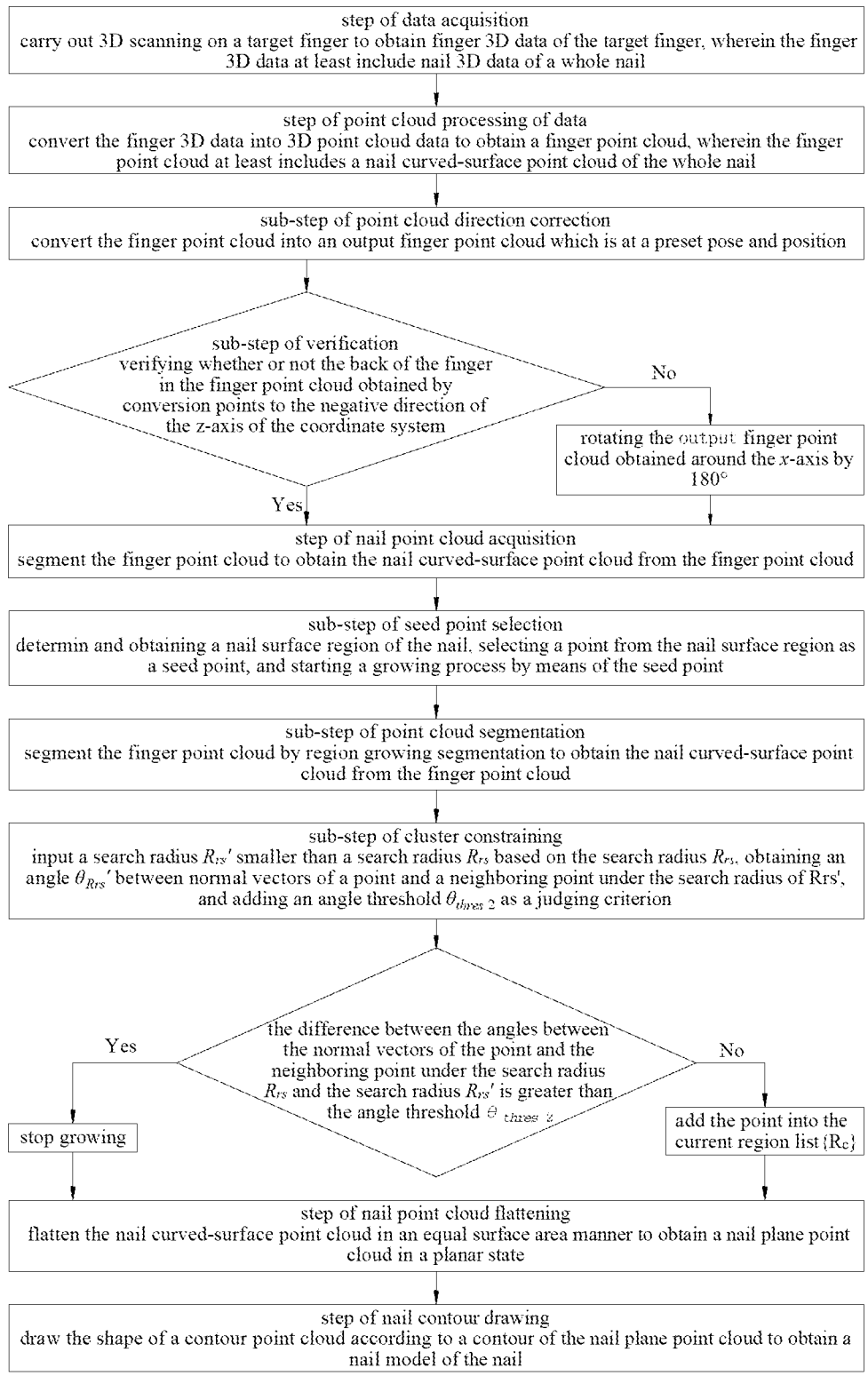
FIG. 13 is a flow diagram of the method for extracting nail contours according to Implementation 3 (the sub-step of seed point $S_0$ selection)
Figure 14:
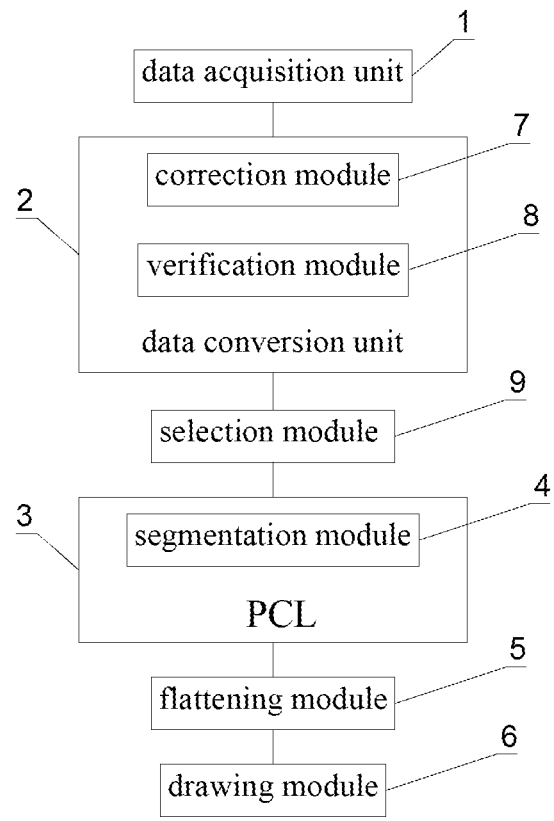
FIG. 14 is a block diagram of a system for extracting nail contours according to Implementation 3 (the selection module)

In view of this, as shown in FIG. 13 and FIG. 14, in Implementation 3, the step of nail point cloud acquisition further comprises the sub-step of seed point So selection performed before the sub-step of point cloud segmentation, and the system for extracting nail contours further comprises a selection module 9 in communication connection with the segmentation module 4. In the sub-step of seed point So selection, the selection module 9 determines and acquires a nail surface region Nrange(x, y) of the nail and selects one point from the nail surface region Nrange(x, y) as a seed point So, and the segmentation module 4 starts the growing process by means of the seed point So.

In this way, the growing process is started from the nail surface region Nrange(x, y) of the nail curved-surface point cloud $Cloud_{Nail-s}$ and just needs to be carried out once to obtain the nail curved-surface point cloud $Cloud_{Nail-s}$, so the time of the growing algorithm is shortened, and the efficiency of the algorithm is improved.

Figure 15:
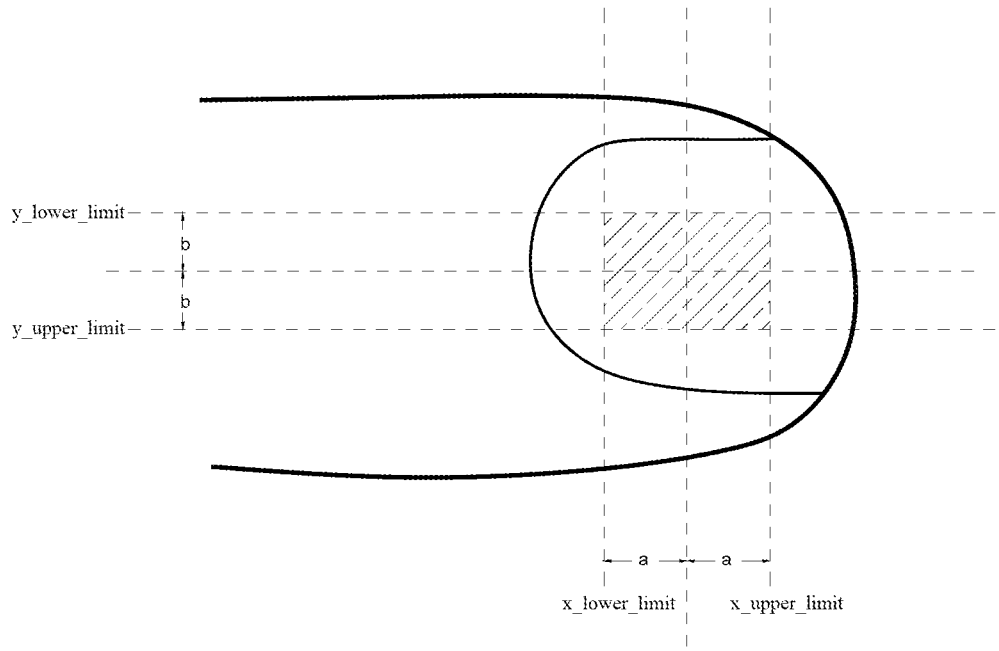
FIG. 15 is a structural diagram under a nail surface region according to Implementation 3.
Figure 16:
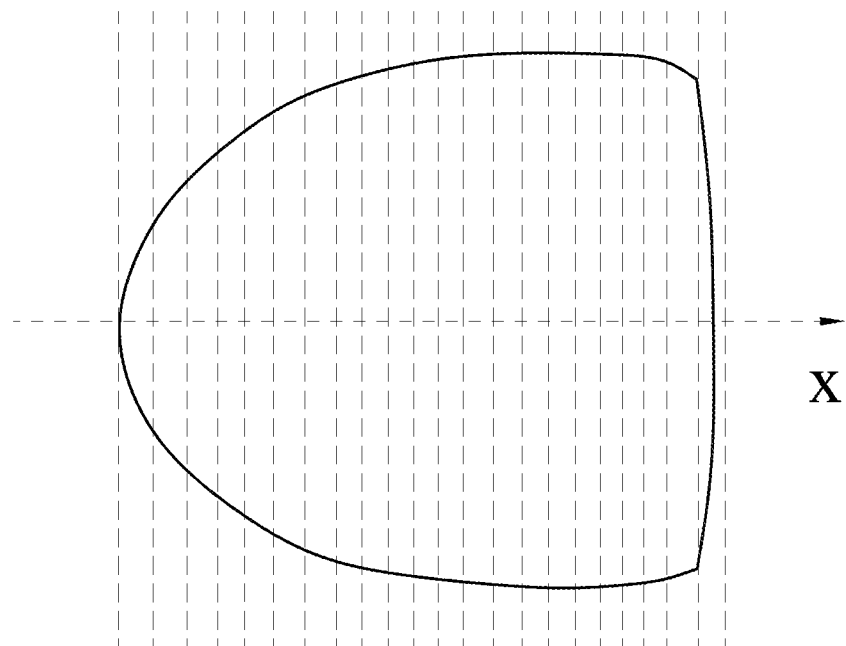
FIG. 16 is a structural diagram of layering of a nail curved-surface point cloud in the nail growing direction according to Implementation 4.

More specifically, the nail surface region Nrange(x, y) is determined based on the output finger point cloud $Cloud_{Finger-o}$ which is obtained after the input finger point cloud $Cloud_{Finger}$ is subjected to tf rotation and is orthogonal with the coordinate axis. As shown in FIG. 15, the shaded area is the nail surface region Nrange(x, y) which is a rectangular range defined by range values on the x-axis and the y-axis and is expressed as:

$$Nrange(x,y)=\{x \in (x_{lower\,limit}, x_{upper\,limit}), y \in (y_{lower\,limit}, y_{upper\,limit})\}$$

Wherein, $X_{min}$ is a minimum value of the nail curved-surface point cloud $Cloud_{Nail-s}$ on the x-axis;

$X_{max}$ is a maximum value of the nail curved-surface point cloud $Cloud_{Nail-s}$ on the x-axis;

$Y_{min}$ is a minimum value of the nail curved-surface point cloud $Cloud_{Nail-s}$ on the y-axis;

$Y_{max}$ is a maximum value of the nail curved-surface point cloud $Cloud_{Nail-s}$ on the y-axis;

The rectangular range can be determined by setting a ratio of the width of the nail curved-surface point cloud $Cloud_{Nail-s}$ on the x-axis to the width of the nail curved-surface point cloud $Cloud_{Nail-s}$ on the y-axis and is preferably symmetrical on both sides of the x-axis and both sides of the y-axis. In a preferred embodiment of this implementation, the scope of the rectangular range of the nail surface region Nrange(x, y) is positioned to half of the width of the whole nail surface region Nrange(x, y) on the y-axis and three quarters of the width of the nail surface region Nrange (x, y) on the x-axis.

That is:

$$x_{lower\,limit}=(x_{min}\times(4-(3-a))+x_{max}\times(3-a))/4$$

$$x_{upper\,limit}=(x_{min}\times(4-(3-a))+x_{max}\times(3-a))/4$$

$$y_{lower\,limit}=(y_{min}\times(2-(1-b))+y_{max}\times(1-b))/2$$

$$y_{upper\,limit}=(y_{min}\times(2-(1-b))+y_{max}\times(1-b))/2$$

Wherein, a is the width of the rectangular range on the x-axis;

b is the width of the rectangular range on the y-axis;

In this way, after the nail surface region Nrange(x, y) is determined, points in the nail surface region Nrange(x, y) are separated by the segmentation module 4 in the PCL 3, and then any one of these points is selected to be used as the seed point $S_0$ for initial growing, so it is ensured that the only one time of growing occurs definitely in the nail surface region Nrange(x, y), the growing process of the nail curved-surface point cloud $Cloud_{Nail-s}$ is simple and is carried out only once, and thus, the growing efficiency of the nail curved-surface point cloud $Cloud_{Nail-s}$ is greatly improved.

Implementation 4

Implementation 4 of the present application provides a method and system for extracting nail contours. The method and system for extracting nail contours are based on the design and implementation of the method and system for extracting nail contours in Implementations 1 to 3, and have an actual process and structure similar to, but not completely identical with the actual process and structure of the method and system in Implementations 1 to 3, and the differences therebetween will be emphatically described below. Other details, except the differences, should be regarded as being identical with those in Embodiments 1 to 3, and will no longer be described.

In the step of nail point cloud flattening, when the nail curved-surface point cloud $Cloud_{Nail-s}$ is flattened into the nail plane point cloud $Cloud_{Nail-p}$ in the equal surface area manner by the flattening module 5, the nail curved-surface point cloud $Cloud_{Nail-s}$ is curved, so a nail sticker made using the nail plane point cloud $Cloud_{Nail-p}$ as a model cannot perfectly fit the nail.

To solve this problem, in Implementation 4, in the step of nail point cloud flattening, the nail curved-surface point cloud $Cloud_{Nail-s}$ is horizontally segmented into n layers of point clouds $L_i$ along the x-axis by the flattening module 5, and then each layer of point cloud $L_i$ is flattened as a whole in an equal length manner, so that the nail plane point cloud $Cloud_{Nail-p}$ in the planar state is obtained.

Each layer of point cloud $L_i$ is:

$L_i = \{p \in Cloud_{Nail-s} | p_x <= limitL_i \ \& \ p_x >= limitR_i\}$

Wherein, $L_i$ is the current layer of point cloud $L_i$ obtained after horizontal segmentation along the x-axis;

p is a point in the current layer of point cloud $L_i$;

$p_x$ is the x-coordinate of the point p;

$limitL_i$ is the minimum value of the current layer of cloud $L_i$ on the x-axis;

$limitR_i$ is the maximum value of the current layer of cloud $L_i$ on the x-axis.

All points in each layer of point cloud $L_i$ in the nail curved-surface point cloud $Cloud_{Nail-s}$ are traversed, as long as the x-coordinate $p_x$ of the point p meets $limitL_i \leq p_x \leq limitR_i$, the point p will be classified to the current layer $L_i$ and then added into the current region list $\{R_c\}$.

More specifically, as for the range along the x-axis of the points in each layer of point cloud $L_i$, $limitL_i = min \ x + i \times ld$ $limitR_i min \ x + (i+1) \times ld$ $ld = (max \ x - min \ x)/n$ Wherein, minx is the minimum value of the current layer of point cloud $L_i$ on the x-axis;

maxx is the maximum value of the current layer of point cloud $L_i$ on the x-axis;

ld is the width of each layer of point cloud $L_i$;

n is the number of layers into which the nail curved-surface point cloud $Cloud_{Nail-s}$ is horizontally segmented along the x-axis;

Herein, n is not a constant value and is determined by the length of the nail curved-surface point cloud $Cloud_{Nail-s}$ on the x-axis and the density of the point cloud input.

Or, the density of the point cloud can be obtained according to the length of the nail curved-surface point cloud $Cloud_{Nail-s}$ on the x-axis and the number n of layers input;

In this way, the nail curved-surface point cloud $Cloud_{Nail-s}$ is layered in the nail growing direction, namely the positive direction of the x-axis, then each layer of point cloud $L_i$ is flattened in an equal length manner, and the length in the y-axis direction of each layer of point cloud $L_i$ will not be changed before and after flattening, so that the nail plane point cloud $Cloud_{Nail-p}$ obtained in this way can perfectly fit the nail in the width direction of the nail, namely the y-axis direction. The nail plane point cloud $Cloud_{Nail-p}$ is flattened only in the positive direction of the x-axis, so that the nail plane point cloud $Cloud_{Nail-p}$ matches the growing direction of the nail and the symmetry of the nail in the nail growing direction, errors caused by conversion from a curved surface to a plane are reduced, and the shape and length of the flattened nail plane point cloud $Cloud_{Nail-p}$ in the lateral dimension of the nail. On this basis, the contour drawn according to the contour point cloud $Cloud_{Contour}$ of the nail plane point cloud $Cloud_{Nail-p}$ can better fit the nail in the lateral dimension of the nail, the nail sticker made according to the contour can be completely stuck on the nail, and the situation where the nail sticker fails to cover the whole nail or is out of the range of the nail is avoided.

Figure 17:
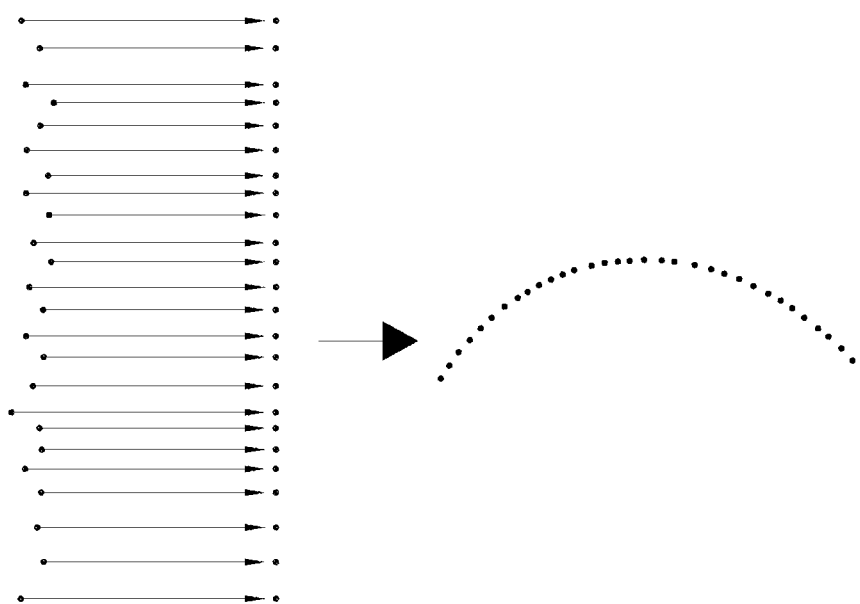
FIG. 17 is a structural diagram of all points, unified to the same plane, on each layer of point cloud according to Implementation 4.

However, as shown in FIG. 17, in the step of nail point cloud flattening, the x-coordinates of all points $p_j$ in each layer of point cloud $L_i$ are identical, and the y-coordinates and the z-coordinates of the points $p_j$ keep unchanged, so that an approximately arc point cloud set $stand\_L_i$ is obtained.

In brief, all the points $p_j$ on different layers of point clouds $L_i$ are unified to the same level to facilitate next calculation for flattening. Specifically, each layer of point cloud $L_i$ is mapped onto a plane $x = XL_i$ by mapping f, and the approximately arc point cloud set $stand\_L_i$ is obtained from each layer of point cloud $L_i$.

$stand\_L_i = f(L_i)$ $f: p \in L_i \rightarrow p_x = XL_{ix}$

Figure 18:
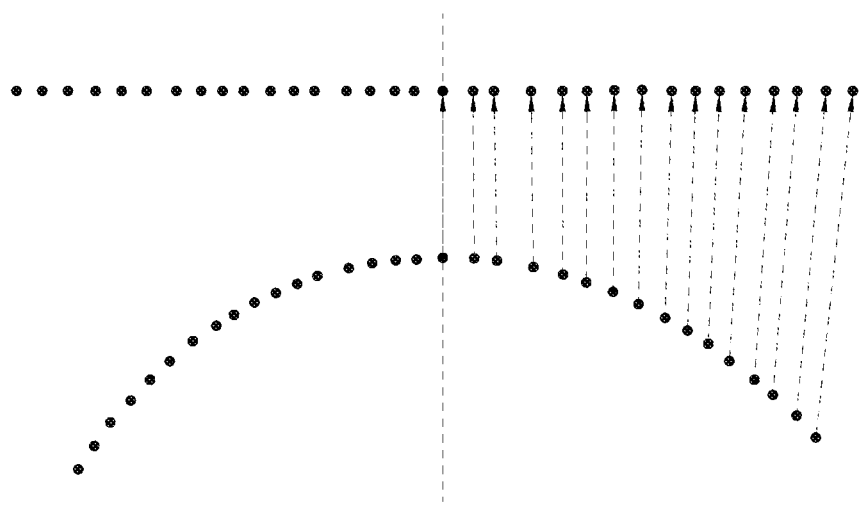
FIG. 18 is a structural diagram of spreading of all point clouds unified to the same plane according to Implementation 4.

Then, as shown in FIG. 18, all points p in each layer of point cloud set $stand\_L_i$ are divided into two parts, $L\_part1_i$ and $L\_part2_i$ according to the y-coordinate $Center_y$ of the center line of the nail in the nail curved-surface point cloud $Cloud_{Nail-s}$, wherein:

$L\_part1_i = \{|p_y <= Center_y\}$ $L\_part2_i = \{|p_y > Center_y\}$

Wherein, $stand\_L_i$ is the approximately arc point cloud set obtained after the x-coordinates of all the points $p_j$ in each layer of point cloud $L_i$ are unified and the y-coordinates and the z-coordinates of the points are kept unchanged;

f is the mapping;

p is the point in the current layer of point cloud set $stand\_L_i$;

$p_x$ is the x-coordinate of the point p;

$XL_{ix}$ is the x-coordinate of the plane $XL_i$;

$L\_part1_i$ is an arc point cloud set on one side of the center line of the nail in the current layer of point cloud set $stand\_L_i$;

$L\_part2_i$ is an arc point cloud set on the other side of the center line of the nail in the current layer of point cloud set $stand\_L_i$;

$p_y$ is the y-coordinate of the point p;

$Center_y$ is the y-coordinate of the center line of the nail in the nail curved-surface point cloud $Cloud_{Nail-s}$.

After $stand\_L_i$ is divided into $L\_part1_i$ and $L\_part2_i$, and the arc point cloud $L\_part1_i$ and $L\_part2_i$ of each layer are ordered in a sequence away from the center line of the nail to obtain a point cloud $L\_ordered\_part_i$.

The specific algorithm is as follows:

Input:
   Input the point cloud $L\_part_i$
   Input the radius threshold Rthres Output:
   Output the point cloud $L\_ordered\_part_i$ obtained after ordering Initialization:
   Initialize the ordered point cloud $L\_ordered\_part_i$
   Initialize the point list $\{P\}$, and push all points in the point cloud $L\_part_i$ into the list $\{P\}$
   Calculate the normal vector $\{N\}$ of the points in the point cloud input
   Calculate the curvature $\{c\}$ of the points in the point cloud input Algorithm cycle:
   Traverse all the points in the list $\{P\}$ to find out $\{P_0\}$, the y-coordinate of which is nearest to the y-coordinate $Center_y$ of the center line of the finger
   Remove $\{P_0\}$ from the list $\{P\}$ $\{p\} \leftarrow \{p\} \backslash P_0$
   Push $\{P_0\}$ into the point cloud $L\_ordered\_part_i$ $L\_ordered\_part_i \leftarrow L\_ordered\_part_i \cup P_0$ As long as the list {P} is not empty,
Find out the current maximum point $P_{end}$ in the point cloud L_ordered_part$_i$
Find out a point $P_{min}$, the linear distance to the current maximum point $P_{end}$ is the smallest, from the list {A}, and remove point $P_{min}$ from the list {A} {A}←{A}\$P_{min}$
Push $P_{min}$ into the point cloud L_ordered_part$_i$,
L_ordered_part$_i$←L_ordered_part$_i$∪$P_{min}$
When the list {P} is empty, output the ordered L_ordered_part$_i$
Then, expand the ordered arc point cloud L_ordered_part$_i$ into a linear point cloud L_expand_part$_i$, wherein, $$d\_curve = d\_straight$$

d_curve is approximately equal to the linear distance between point P1 and point P2:

$$d\_curve \approx \sqrt{(P1_y - P2_y)^2 + (P1_z - P2_z)^2}$$

Corresponding points P1' and P2' obtained after expanding are:

$$P1' = P1 + \vec{v}, \vec{v} = (0\ 0\ -P1_s)$$

$$P2' = P1' + \vec{u}, \vec{u} = (0\ d\_curve\ 0)$$

Sequentially calculate L_expand_part$_i$ corresponding points of all points;
Finally, combine all linear point clouds L_expand_part$_i$ into new Cloud_expand$_{Nail}$ $$Cloud\_expand_{Nail} = \Sigma L\_expand\_part_i$$

The new Cloud_expand$_{Nail}$ is the nail plane point cloud Cloud$_{Nail-p}$.

Implementation 5

Implementation 5 of the present application provides a method and system for extracting nail contours. The method and system for extracting nail contours are based on the design and implementation of the method and system for extracting nail contours in Embodiments 1 to 4, and have an actual process and structure similar to, but not completely identical with the actual process and structure of the method and system in Embodiments 1 to 4, and the differences therebetween will be emphatically described below. Other details, except the differences, in this implementation should be regarded as being identical with those in Embodiments 1 to 4, and will no longer be described.

Figure 19:
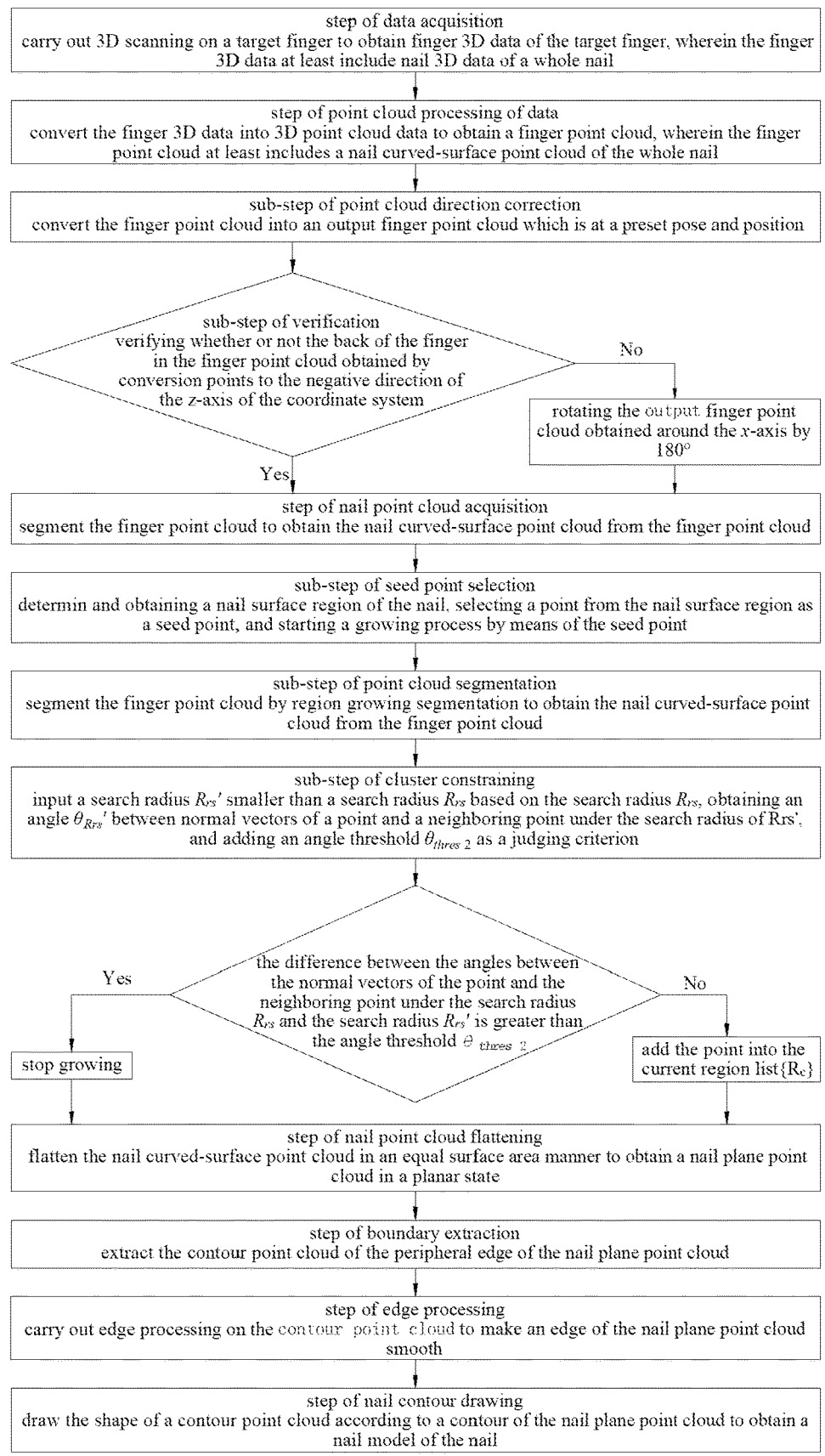
FIG. 19 is a flow diagram of a method for extracting nail contours according to implementation 5.
Figure 20:
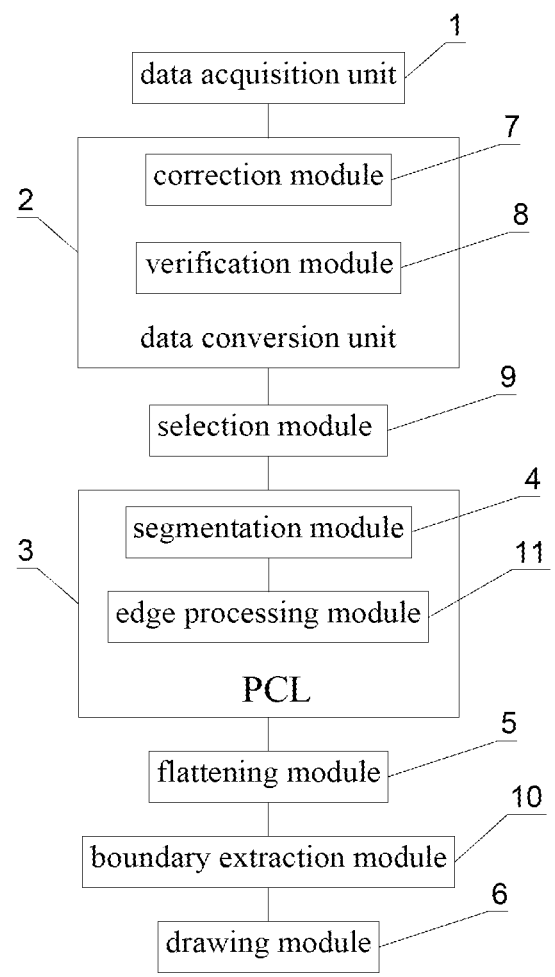
FIG. 20 is a block diagram of a system for extracting nail contours according to implementation 5.

In Implementation 5, as shown in FIG. 19 and FIG. 20, before the nail contour is drawn, the method for extracting nail contours further comprises the step of boundary extraction, and the system for extracting nail contours further comprises a boundary extraction module 10 which is in communication connection with the flattening module 5 and the drawing module 6. In the step of boundary extraction, a contour point cloud Cloud$_{Contour}$ of the peripheral edge of the nail plane point cloud Cloud$_{Nail-p}$ is extracted by the boundary extraction module 10, and then the shape of the contour point cloud Cloud$_{Contour}$ is drawn by the drawing module 6 to obtain the nail model of the nail.

The contour point cloud Cloud$_{Contour}$ of the nail plane point cloud Cloud$_{Nail-p}$ is extracted by the boundary extraction module 10. However, if the flatten nail plane point cloud Cloud$_{Nail-p}$ is directly extracted, an extracted edge will be in a sawtooth shape due to the noise of the original point cloud and errors generated during nail segmentation, the contour point cloud Cloud$_{Contour}$ of the outermost layer is not smooth, and the attractiveness of the drawn nail contour will be affected. Thus, the edge of the nail plane point cloud Cloud$_{Nail-p}$ can be smoothed to ensure the edge contour point cloud Cloud$_{Contour}$ of the nail plane point cloud Cloud$_{Nail-p}$ smoother under the precondition that original edge features of the nail are maintained to the greatest extent.

The boundary extraction module 10 is in communication connection with the flattening module 5 and the drawing module 6. The boundary extraction module 10 is arranged independently and is in communication connection with the PCL 3; or the boundary extraction module 10 is integrated in the PCL 3 or is one part of the PCL 3.

In this way, when the nail contour is drawn, the contour point cloud Cloud$_{Contour}$ in the nail plane point cloud Cloud$_{Nail-p}$ can be extracted by the boundary extraction module 10.

Then, the step of nail point cloud flattening further comprises the sub-step of edge processing performed after the sub-step of boundary extraction, and the system for extracting nail contours further comprises an edge processing module 11 which is located in the PCL 3 and is in communication connection with the boundary extraction module 10 and the drawing module 6. In the step of boundary extraction, the contour point cloud Cloud$_{Contour}$ is smoothed by the edge processing module 11 to make the edge smooth.

The edge processing module 11 is in communication connection with the boundary extraction module 10 and the drawing module 6. The edge processing module 11 is arranged independently and is in communication with the PLC 3; or the edge processing module 11 is integrated in the PCL 3 or is one part of the PCL 3.

Specifically, in the step of edge processing, the edge processing module carries out curve fitting on the unsmooth edge of the contour point clout (hereinafter also referred to as input contour point clout Cloud$_{Contour-i}$) extracted by the boundary extraction module 10 in the step of boundary extraction to obtain a smooth contour point cloud (hereinafter also referred to as output contour point clout Cloud$_{Contour}$), so that a smooth nail curve is obtained. The step of edge processing comprises:
① The input contour point cloud Cloud$_{Contour-i}$ of the nail plane point cloud Cloud$_{Nail-p}$ is extracted by the boundary extraction module 10 provided by the PCL 3;
② Curve fitting is carried out on the input contour point cloud Cloud$_{Contour-i}$ extracted to obtain a curve Contour_hull$_1$;
③ The x-coordinate $x_1$ of the widest part of the input contour point cloud Cloud$_{Contour-i}$ is found out along the x-axis;
④ Points, greater than the coordinate $x_1$, of all points of the input contour point cloud Cloud$_{Contour-i}$ are obtained to obtain a set hull$_1$;
⑤ Points, smaller than the coordinate $x_1$, of all points of the fitting curve Cloud$_{Contour-i}$ are obtained to obtain a set hull$_2$;

The point set hull$_1$ and the point set hull$_2$ are combined to obtain a final contour point cloud Cloud$_{Contour}$.

The contour point cloud obtained in this way matches the arc and the edge contour of the nail and better fits the specific edge contour of the nail, the drawn nail contour is more attractive, and the attractiveness of a nail sticker made based on a nail sticker model manufactured based on the nail contour is improved.

Those ordinarily skilled in the art would appreciate that the modules and arithmetic steps in the embodiments described in the implementations disclosed above can be implemented through electronic hardware, computer software or the combination of the electronic hardware and the computer software. The software modules can be configured in a computer storage medium in any form. To clearly explain the interchangeability of hardware and software, the compositions and steps of the embodiments have been described in general according to the functions. Whether or not these functions are implemented by hardware or software depends on specific applications and design constraints of corresponding technical solutions. For each specific application, those skilled in the art can implement the functions described through different methods, which should not be construed as being out of scope of the invention.

It should be understood that the implementations disclosed above can be realized in different forms, and the scope of the claims should not be construed as being limited to the implementations described in the specification. Specifically speaking, these implementations are provided to make the disclosure understood completely and comprehensively and convey the conception of the implementations of the invention to those skilled in the art. Actually, the disclosure aims to cover all alternative solutions, amendments and equivalent solutions of these implementations based on the spirit and scope of the invention. In addition, a large number of specific details have been illustrated in the detailed description of the implementations of the disclosure to gain a thorough understanding of the disclosure. Obviously, those ordinarily skilled in the art can realize the implementations of the disclosure even without these specific details.

The invention claimed is:

1. A method for a processor extracting nail contours, comprising:
   a step of data acquisition: carrying out 3D scanning on a target finger to obtain finger 3D data $Data_{Finger}$ of the target finger, wherein the finger 3D data $Data_{Finger}$ at least include nail 3D data $Data_{Nail}$ of a whole nail;
   a step of point cloud processing of data: converting the finger 3D data $Data_{Finger}$ into 3D point cloud data to obtain a finger point cloud $Cloud_{Finger}$, wherein the finger point cloud $Cloud_{Finger}$ at least includes a nail curved-surface point cloud $Cloud_{Nail-s}$ of the whole nail;
   a step of nail point cloud acquisition: segmenting the finger point cloud $Cloud_{Finger}$ to separate the nail curved-surface point cloud $Cloud_{Nail-s}$ from the finger point cloud $Cloud_{Finger}$;
   a step of nail point cloud flattening: flattening the nail curved-surface point cloud $Cloud_{Nail-s}$ in an equal surface area manner to obtain a nail plane point cloud $Cloud_{Nail-p}$ in a planar state; and
   a step of nail contour drawing: drawing a shape of a contour point cloud $Cloud_{Contour}$ according to a contour of the nail plane point cloud $Cloud_{Nail-p}$ to obtain a nail model of the nail,
   wherein in the step of nail point cloud flattening, the nail curved-surface point cloud $Cloud_{Nail-s}$ is horizontally segmented along the x-axis into n layers of point clouds $L_i$, and then each layer of point cloud $L_i$ is spread and flattened as a whole in an equal length manner, so that the nail plane point cloud $Cloud_{Nail-p}$ of the nail in the planar state is obtained,
   wherein the step of nail point cloud flattening specifically comprises:
   unifying x-coordinates of all points $p_j$ in each layer of point cloud $L_i$, and keeping y-coordinates and z-coordinates of the points $p_j$ unchanged, so that an approximately arc point cloud set $stand\_L_i$ is obtained;
   according to a y-coordinate $Center_y$ of a center line of the nail, dividing all points p in each layer of point cloud set $stand\_L_i$ into two parts: $L\_part1_i$ and $L\_part2_i$; and
   ordering the arc point clouds $L\_part1_i$ and $L\_part2_i$ of each layer in a sequence away from the center line of the nail to obtain $L\_ordered\_part_i$.

2. The method for extracting nail contours according to claim 1, wherein the step of point cloud processing of data comprises:
   a sub-step of point cloud direction correction: converting the finger point cloud $Cloud_{Finger}$ into an output finger point cloud $Cloud_{Finger-o}$ which is at a preset pose and position;
   wherein the preset pose and position mean that a centroid of the output finger point cloud $Cloud_{Finger-o}$ overlaps with an origin of a coordinate system in a PCL, a front end of the finger points to a positive direction of an x-axis of the coordinate system and a back of the finger points to a negative direction of a z-axis of the coordinate system.

3. The method according to claim 2, wherein after the sub-step of point cloud direction correction, the step of point cloud processing of data further comprises:
   a sub-step of verification: verifying whether or not the back of the finger in the finger point cloud obtained by conversion points to the negative direction of the z-axis of the coordinate system;
   if so, rotating the finger point cloud obtained by conversion around the x-axis by 180°, and using the rotated finger point cloud as the output finger point cloud $Cloud_{Finger-o}$, or if not, directly using the finger point cloud obtained by conversion as the output finger point cloud $Cloud_{Finger-o}$.

4. The method according to claim 1, wherein the step of nail point cloud acquisition comprises:
   a sub-step of point cloud segmentation: segmenting the finger point cloud $Cloud_{Finger}$ by region growing segmentation to obtain the nail curved-surface point cloud $Cloud_{Nail-s}$ from the finger point cloud $Cloud_{Finger}$.

5. A method for a processor extracting nail contours, comprising:
   a step of data acquisition: carrying out 3D scanning on a target finger to obtain finger 3D data $Data_{Finger}$ of the target finger, wherein the finger 3D data $Data_{Finger}$ at least include nail 3D data $Data_{Nail}$ of a whole nail;
   a step of point cloud processing of data: converting the finger 3D data $Data_{Finger}$ into 3D point cloud data to obtain a finger point cloud $Cloud_{Finger}$, wherein the finger point cloud $Cloud_{Finger}$ at least includes a nail curved-surface point cloud $Cloud_{Nail-s}$ of the whole nail;
   a step of nail point cloud acquisition: segmenting the finger point cloud $Cloud_{Finger}$ to obtain the nail curved-surface point cloud $Cloud_{Nail-s}$ from the finger point cloud $Cloud_{Finger}$;
   a step of nail point cloud flattening: flattening the nail curved-surface point cloud $Cloud_{Nail-s}$ in an equal surface area manner to obtain a nail plane point cloud $Cloud_{Nail-p}$ in a planar state; and
   a step of nail contour drawing: drawing a shape of a contour point cloud $Cloud_{Contour}$ according to a contour of the nail plane point cloud $Cloud_{Nail-p}$ to obtain a nail model of the nail,
   wherein the step of nail point cloud acquisition comprises:
   a sub-step of point cloud segmentation: segmenting the finger point cloud $Cloud_{Finger}$ by region growing segmentation to obtain the nail curved-surface point cloud $Cloud_{Nail-s}$ from the finger point cloud $Cloud_{Finger}$,
wherein after the sub-step of point cloud segmentation, the step of nail point cloud acquisition further comprises:
a sub-step of cluster constraining: inputting a search radius Rrs' smaller than a search radius $R_{rs}$ based on the search radius $R_{rs}$, obtaining an angle $\theta_{Rrs'}$ between normal vectors of a point and a neighboring point under the search radius of Rrs', and adding an angle threshold $\theta_{thres\_2}$ as a judging criterion; and
if a difference between the angles between the normal vectors of the point and the neighboring point under the search radius Rrs and the search radius Rrs' is greater than the angle threshold $\theta_{thres\_2}$, stopping growing.

6. The method for extracting nail contours according to claim 4, wherein before the sub-step of point cloud segmentation, the step of nail point cloud acquisition further comprises:
a sub-step of seed point So selection: determining and obtaining a nail surface region (x, y) of the nail, selecting a point from the nail surface region (x, y) as a seed point $S_0$, and starting a growing process by means of the seed point $S_0$.

7. The method according to claim 1, after the step of nail point cloud flattening, further comprising:
a step of edge processing: carrying out edge processing on the nail plane point cloud $Cloud_{Nail-p}$ to make an edge of the nail plane point cloud $Cloud_{Nail-p}$ smooth.

8. A system including a processor and a memory, used for implementing a method for the processor extracting nail contours, the method includes a step of data acquisition: carrying out 3D scanning on a target finger to obtain finger 3D data $Data_{Finger}$ of the target finger, wherein the finger 3D data $Data_{Finger}$ at least include nail 3D data $Data_{Nail}$ of a whole nail; a step of point cloud processing of data: converting the finger 3D data $Data_{Finger}$ into 3D point cloud data to obtain a finger point cloud $Cloud_{Finger}$, wherein the finger point cloud $Cloud_{Finger}$ at least includes a nail curved-surface point cloud $Cloud_{Nail-s}$ of the whole nail; a step of nail point cloud acquisition: segmenting the finger point cloud $Cloud_{Finger}$ to separate the nail curved-surface point cloud $Cloud_{Nail-s}$ from the finger point cloud $Cloud_{Finger}$; a step of nail point cloud flattening: flattening the nail curved-surface point cloud $Cloud_{Nail-s}$ in an equal surface area manner to obtain a nail plane point cloud $Cloud_{Nail-p}$ in a planar state; and a step of nail contour drawing: drawing a shape of a contour point cloud $Cloud_{Contour}$ according to a contour of the nail plane point cloud $Cloud_{Nail-p}$ to obtain a nail model of the nail, the system comprising:
a data acquisition unit which is used for carrying out 3D scanning on a target finger to obtain finger 3D data $Data_{Finger}$ of the target finger, wherein the finger 3D data $Data_{Finger}$ at least include nail 3D data $Data_{Nail}$ of a whole nail;
a data conversion unit which is in communication connection with the data acquisition unit, receives the finger 3D data $Data_{Finger}$ and converts the finger 3D data $Data_{Finger}$ of into 3D point cloud data to obtain a finger point cloud $Cloud_{Finger}$, wherein the finger point cloud $Cloud_{Finger}$ at least includes a nail curved-surface point cloud $Cloud_{Nail-s}$ of the whole nail;
a PCL which is in communication connection with the data conversion unit;
a segmentation module which is located in the PCL and is configured to segment the finger point cloud $Cloud_{Finger}$ to extract a nail curved-surface point cloud of the nail from the finger point cloud $Cloud_{Finger}$;
a flattening module which is in communication connection with the PCL and is configured to spread and flatten the nail curved-surface point cloud $Cloud_{Nail-s}$ in an equal surface area manner to obtain a nail plane point cloud $Cloud_{Nail-p}$ in a planar state; and
a drawing module which is in communication connection with the flattening module, receives the nail plane point cloud $Cloud_{Nail-p}$, and draws a shape of a contour point cloud $Cloud_{Contour}$ according to a contour of the nail plane point cloud $Cloud_{Nail-p}$ to obtain a nail model of the nail,
wherein the flattening module is configured to unify x-coordinates of all points $p_j$ in each layer of point cloud $L_i$, keep y-coordinates and z-coordinates of the points $p_j$ unchanged to obtain an approximately arc point cloud set stand_$L_i$, divide all points p in each layer of point cloud set stand_$L_i$ into two parts: L_part1$_i$ and L_part2$_i$, according to a y-coordinate Center$_y$ of a center line of the nail, and finally orders the arc point clouds L_part1$_i$ and L_part2$_i$ of each layer in a sequence away from the center line of the nail to obtain L_ordered_part$_i$.

9. The system according to claim 8, wherein the data conversion unit comprises a correction module configured to convert the finger point cloud $Cloud_{Fingei}$ into an output finger point cloud $Cloud_{Finger-o}$, which is at a preset pose and position.

10. The system according to claim 9, wherein the system for extracting nail contours further comprises:
a verification module which is in communication connection with the correction module and is configured to receive the finger point cloud obtained by conversion and verify a pointing direction of a back of a finger in the finger point cloud:
if the back of the finger in the finger point cloud obtained by conversion points to a positive direction of a z-axis of a coordinate system, the correction module rotates the finger point cloud around an x-axis by 180°, and then the rotated finger point cloud is used as the output finger point cloud $Cloud_{Finger-o}$;
if the back of the finger in the finger point cloud obtained after conversion points to a negative direction of the z-axis of the coordinate system, the finger point cloud obtained by conversion is directly used as the output finger point cloud $Cloud_{Finger-o}$.

11. The system according to claim 8, wherein the system for extracting nail contours further comprises:
a seed point $S_0$ selection module which is in communication connection with the segmentation module and is configured to obtain a nail surface region Nrange (x,y) of the nail curved-surface point cloud $Cloud_{Nail-s}$ and select a point from the nail surface region Nrange (x,y) as a seed point $S_0$, wherein the segmentation module starts a growing process by means of the seed point $S_0$.

12. The system according to claim 8, wherein the flattening module is configured to segment the nail curved-surface point cloud $Cloud_{Nail-s}$ along the x-axis into n layers of point clouds $L_i$, and then each layer of point cloud $L_i$ is spread and flattened as a whole in an equal length manner to obtain a nail plane point cloud $Cloud_{Nail-p}$ in a planar state.

13. The system for extracting nail contours according to claim 8, wherein the PCL further comprises:

an edge processing module used for carrying out edge processing on the nail plane point cloud $Cloud_{Nail-p}$ to make an edge of the nail plane point cloud $Cloud_{Nail-p}$ smooth.

\* \* \* \* \*